US012562911B2

(12) United States Patent
Li et al.

(10) Patent No.: US 12,562,911 B2
(45) Date of Patent: Feb. 24, 2026

(54) FORK PROCESSING METHOD AND BLOCKCHAIN NODE

(71) Applicant: HUAWEI TECHNOLOGIES CO., LTD., Shenzhen (CN)

(72) Inventors: Danyang Li, Shenzhen (CN); Xun Liu, Hangzhou (CN); Ji Wang, Beijing (CN); Chunyu Cai, Shenzhen (CN); Fan Pan, Beijing (CN)

(73) Assignee: Huawei Technologies Co., LTD.

( * ) Notice: Subject to any disclaimer, the term of this patent is extended or adjusted under 35 U.S.C. 154(b) by 943 days.

(21) Appl. No.: 17/591,440

(22) Filed: Feb. 2, 2022

(65) Prior Publication Data

US 2022/0158836 A1     May 19, 2022

Related U.S. Application Data

(63) Continuation of application No. PCT/CN2020/107840, filed on Aug. 7, 2020.

(30) Foreign Application Priority Data

Aug. 7, 2019    (CN) .......................... 201910726701.6

(51) Int. Cl.
    *H04L 9/32*          (2006.01)
    *H04L 9/00*          (2022.01)
(52) U.S. Cl.
    CPC .......... *H04L 9/3218* (2013.01); *H04L 9/3297* (2013.01); *H04L 9/50* (2022.05); *H04L 2209/463* (2013.01)
(58) Field of Classification Search
    CPC ........ H04L 9/3218; H04L 9/3297; H04L 9/50
    See application file for complete search history.

(56) References Cited

U.S. PATENT DOCUMENTS

| | | | |
|---|---|---|---|
| 2016/0027229 A1 | 1/2016 | Spanos et al. | |
| 2018/0349621 A1* | 12/2018 | Schvey | ................. H04L 9/3236 |

(Continued)

FOREIGN PATENT DOCUMENTS

| | | |
|---|---|---|
| CA | 3065319 A1 | 12/2018 |
| CN | 106878071 A | 6/2017 |

(Continued)

OTHER PUBLICATIONS

I. Eyal, A. E. Gencer, E. G. Sirer, and R. Van Renesse, "Bitcoinng: A scalable blockchain protocol," in Proceedings of 13th USENIX Symposium on Networked Systems Design and Implementation (NSDI 16), Santa Clara, CA, USA, 2016, pp. 45-59.*

(Continued)

*Primary Examiner* — Matthew T Henning
(74) *Attorney, Agent, or Firm* — Fish & Richardson P.C.

(57) ABSTRACT

A block generation method and apparatus for blockchain networks. The method includes that when a first blockchain node is a leader, the first blockchain node packs a leader-elected transaction in a transaction pool into a first block, where the leader-elected transaction records a leader proof of the first blockchain node. The leader proof records a voting state in which each of the plurality of second block-chain nodes votes on the first blockchain node, and the voting state indicates whether a vote is a positive vote or a negative vote. The first blockchain node sends the first block to the plurality of second blockchain nodes, so that the first blockchain node and/or the second blockchain nodes per-form fork processing based on the leader proof.

15 Claims, 19 Drawing Sheets

(56) References Cited

U.S. PATENT DOCUMENTS

2018/0374173 A1*  12/2018  Chen ................... G06Q 50/184
2019/0268138 A1*   8/2019  Mankovskii ......... G06Q 20/065
2019/0295049 A1*   9/2019  Karame ............. G06Q 20/3678

FOREIGN PATENT DOCUMENTS

CN         107105032 A     8/2017
CN         108182635 A     6/2018
CN         109902125 A     6/2019
WO     WO-2017148245 A1 *  9/2017  ............. G06F 21/10

OTHER PUBLICATIONS

PCT International Search Report and Written Opinion issued in
International Application No. PCT/CN2020/107840 on Nov. 10,
2020, 18 pages (with English translation).
Extended European Search Report issued in European Application
No. 20850489.4 on Aug. 3, 2022, 8 pages.
Fluri et al., "Improving Raft When There Are Failures," 2018 Eighth
Latin-American Symposium on Dependable Computing (LADC),
Symposium Ondependable Computing (LADC), Oct. 8, 2018, 4
pages.
Cachin et al., "Blockchain Consensus Protocols in the Wild,"
CoRR, Submitted on Jul. 7, 2017, arXiv:1707.01873v2, 24 pages.
Communication pursuant to Article 94(3) EPC in European Appln.
No. 20850489.4, mailed on Oct. 28, 2025, 6 pages.

* cited by examiner

FORK PROCESSING METHOD AND BLOCKCHAIN NODE

CROSS-REFERENCE TO RELATED APPLICATIONS

This applications a continuation of International Application PCT/CN2020/107840, filed on Aug. 7, 2020, which claims priority to Chinese Patent. Application No. 201910726701.6, filed on Aug. 7, 2019. The disclosures of the aforementioned applications are hereby incorporated by reference in their entireties.

TECHNICAL FIELD

This application relates to the blockchain field, and in particular, to a fork processing method and a blockchain node.

BACKGROUND

A blockchain is a chained data structure obtained by combining data blocks in a chronological order, and is a distributed ledger that is protected against tampering or forging by using cryptology. The blockchain can be widely used in industries such as finance, insurance, law, art, real estate, and logistics. A blockchain system usually includes a plurality of blockchain nodes, and the blockchain nodes may communicate with each other in a wired or wireless manner.

A consensus mechanism is an important mechanism in the blockchain system. During running of the blockchain system, each blockchain node in the blockchain system initiates various transactions, and then a blockchain node obtains a block generation qualification, in other words, the blockchain node packages these transactions into a block, connects the block to a blockchain of the node, and sends the block to another blockchain node. After receiving the block, the another blockchain node determines whether to connect the received block behind the blockchain of the node (that is, flushing). With the flushing of each block, a chain length (namely, a block height) of the blockchain continuously increases. In principle, the blockchain system expects that only one blockchain node obtains the block generation qualification, to package the transactions into a block, connect the block to a blockchain of the node, and send the block to another blockchain node. However, if at least two blockchain nodes obtain the block generation qualification at the same time, the blockchain nodes package the transactions into blocks, connect the blocks to blockchains of the nodes, and send the blocks to other blockchain nodes. Therefore, there is a fork. The consensus mechanism is used to determine which blockchain nodes have the block generation qualification, how to flush generated blocks, and how to process the fork. The consensus mechanism can ensure that blocks of all nodes in the blockchain are consistent.

However, in existing fork processing, a relatively long blockchain is usually selected as a main chain, and a relatively short blockchain is discarded. Consequently, the relatively long blockchain has an absolute advantage, and this violates an equality principle of blockchains.

SUMMARY

This application provides a fork processing method and a blockchain node, so that fork processing can be performed based on a participant in a blockchain. This complies with an equality principle of the blockchain.

According to a first aspect, a fork processing method is provided, including:

when a first blockchain node is a leader, packing, by the first blockchain node, a leader-elected transaction in a transaction pool into a first block, where the leader-elected transaction records a leader proof of the first blockchain node, the leader proof records a voting state in which each of the plurality of second blockchain nodes votes on the first blockchain node, and the voting state indicates whether a vote is a positive vote or a negative vote; and sending the first block to the plurality of second blockchain nodes, so that the first blockchain node and/or the plurality of second blockchain nodes perform fork processing based on the leader proof.

In some possible designs, the first blockchain node packs a first online transaction in the transaction pool into a second block, where the first online transaction records that a third blockchain node becomes a follower of the first blockchain node, and the third blockchain node is a node that is in the plurality of second blockchain nodes and that does not vote for the first blockchain node; and sends the second block to the plurality of second blockchain nodes.

In some possible designs, the method includes: determining that there is a fork in a blockchain of the first blockchain node, where the fork includes a first branch chain and a second branch chain, both the first branch chain and the second branch chain start from a fork point, blocks before the fork point are the same, a last block of the first branch chain is sent by the first blockchain node, and a last block of the second branch chain is sent by a fourth blockchain node; comparing a quantity of participants of the first branch chain with a quantity of participants of the second branch chain, where the participants of the first branch chain include the third blockchain node and a node that votes for the first blockchain node, and the participants of the second branch chain include a node that votes for the fourth blockchain node, and a node that does not vote for the fourth blockchain node but that is represented as a follower of the fourth blockchain node by using a second online transaction; when the quantity of participants of the first branch chain is greater than the quantity of participants of the second branch chain, retaining the first branch chain, and discarding the second branch chain; when the quantity of participants of the second branch chain is greater than the quantity of participants of the first branch chain, retaining the second branch chain, and discarding the first branch chain; and when the quantity of participants of the first branch chain is equal to the quantity of participants of the second branch chain, retaining a branch chain corresponding to a node that becomes the leader later and that is the first blockchain node or the fourth blockchain node, and discarding another blockchain.

In the foregoing solution, the first blockchain node sends the leader-elected transaction to the second blockchain node, so that the first blockchain node and/or plurality of the second blockchain nodes perform fork processing based on the voting state in which each second blockchain node votes on the first blockchain node and that is recorded in the leader proof. This performs fork processing based on the participants in the blockchain, and follows an equality principle of the blockchain.

In some possible designs, the method further includes: sending, by the first blockchain node, a voting notification to each of the plurality of second blockchain nodes, where the voting notification is used to indicate a blockchain node that receives the voting notification to vote; receiving a vote of each from the plurality of second blockchain nodes, where the vote is the positive vote or the negative vote; and when a quantity of positive votes is greater than a quantity of negative votes, changing a state of the first blockchain node to the leader, where the leader is capable of generating a block to each of the plurality of second blockchain nodes.

In some possible designs, the first blockchain node performs the following steps: triggering a timer to perform timing, where a timing time period of the timer is a random waiting time period; when the timer times out in waiting for the random waiting time period, signing the random waiting time period by using a signature generation function, to obtain a time proof; and generating the voting notification based on the time proof.

In the foregoing solution, the random waiting time period is signed by using the signature generation function, to obtain the time proof. This can effectively prevent a byzantine node from forging the random waiting time period to obtain a leader qualification and further maliciously cause forking.

In some possible designs, when no block sent by another blockchain node is received within the random waiting time period, the first blockchain node sends the voting notification to each of the plurality of second blockchain nodes.

In some possible designs, one or more of a last block hash, a term, and a block height are stored in the trusted execution environment of the first blockchain node.

In the foregoing solution, one or more of the last block hash, the term, and the block height are stored in the trusted execution environment, to prevent the byzantine node from forging one or more of the last block hash, the term, and the block height to be elected as the leader and to maliciously cause forking.

In some possible designs, the vote is in an encrypted state when being transmitted between a trusted execution environment of the second blockchain node and the trusted execution environment of the first blockchain node.

In the foregoing solution, the vote is always in the encrypted state in a transmission process, so that the byzantine node can be prevented from forging voting to become the leader and maliciously cause forking.

In some possible designs, the first blockchain node performs the following steps: obtaining the voting state in which each of the plurality of second blockchain nodes votes on the first blockchain node; and signing the voting state by using a signature generation function, to obtain the leader proof.

In the foregoing solution, the leader proof is Obtained by signing the voting state by using the signature generation function. This can effectively prevent the leader proof from being forged, and improve reliability of the leader proof.

In some possible designs, when no flushing notification is received, a third block is flushed to disk. The third block is a block sent to the first blockchain node.

In the foregoing solution, the block can be flushed to disk without a need to receive the flushing notification. This reduces energy consumption of a terminal device, so that the method in this application can be applied to a lightweight terminal device.

According to a second aspect, a blockchain node is provided, including a block generation module and a communications module.

The block generation module is configured to: when a first blockchain node is a leader, pack a leader-elected transaction in a transaction pool into a first block, where the leader-elected transaction records a leader proof of the first blockchain node, the leader proof records a vote state in which each of the plurality of second blockchain nodes votes on the first blockchain node, and the vote state indicates whether a vote is a positive vote or a negative vote The communications module is configured to send the first block to the plurality of second blockchain nodes, so that the first blockchain node and/or the plurality of second blockchain nodes perform fork processing based on the leader proof.

In some possible designs, the block generation module is configured to pack a first online transaction in the transaction pool into a second block, where the first online transaction records that a third blockchain node becomes a follower of the first blockchain node, and the third blockchain node is a node that is in the plurality of second blockchain nodes and that does not vote for the first blockchain node; and the communications module is configured to send the second block to the plurality of second blockchain nodes.

In some possible designs, the node further includes a fork processing module. The fork processing module is configured to determine that there is a fork in a blockchain of the first blockchain node. The fork includes a first branch chain and a second branch chain, both the first branch chain and the second branch chain start from a fork point, blocks before the fork point are the same, a last block of the first branch chain is sent by the first blockchain node, and a last block of the second branch chain is sent by a fourth blockchain node. The fork processing module is configured to: compare a quantity of participants of the first branch chain with a quantity of participants of the second branch chain, where the participants of the first branch chain include the third blockchain node and a node that votes for the first blockchain node, and the participants of the second branch chain include a node that votes for the fourth blockchain node, and a node that does not vote for the fourth blockchain node but that is represented as a follower of the fourth blockchain node by using a second online transaction; when the quantity of participants of the first branch chain is greater than the quantity of participants of the second branch chain, retain the first branch chain, and discard the second branch chain; when the quantity of participants of the second branch chain is greater than the quantity of participants of the first branch chain, retain the second branch chain, and discard the first branch chain; and when the quantity of participants of the first branch chain is equal to the quantity of participants of the second branch chain, retain a branch chain corresponding to a node that becomes the leader later and that is the first blockchain node or the fourth blockchain node, and discard another blockchain.

In some possible designs, the node further includes a leader election module. The leader election module is configured to send a voting notification to each of the plurality of second blockchain nodes, where the voting notification is used to indicate a blockchain node that receives the voting notification to vote. The leader election module is configured to receive a vote from each of the plurality of second blockchain nodes, where the vote is the positive vote or the negative vote. The leader election module is configured to: when a quantity of positive votes is greater than a quantity of negative votes, change a state of the first blockchain node to the leader, where the leader is capable of generating a block to each of the plurality of second blockchain nodes.

In some possible designs, a time proof module is included m a trusted execution environment of the first blockchain node. The time proof module is configured to trigger a timer to perform timing, where a timing time period of the timer is a random waiting time period. The time proof module is configured to: when the timer times out in waiting for the random waiting time period, sign the random waiting time period by using a signature generation function, to obtain a time proof. The time proof module is configured to generate the voting notification based on the time proof.

In some possible designs, when no block sent by another blockchain node is received within the random waiting time period, the time proof module is configured to indicate the leader election module to send the voting notification to each of the plurality of second blockchain nodes.

In some possible designs, one or more of a last block hash, a term, and a block height are stored in the trusted execution environment of the first blockchain node.

In some possible designs, the vote is in an encrypted state when being transmitted between a trusted execution environment of the second blockchain node and the trusted execution environment of the first blockchain node.

In some possible designs, the trusted execution environment of the first blockchain node includes a leader proof module. The leader proof module is configured to obtain the voting state in which each of the plurality of second blockchain nodes votes on the first blockchain node; and the leader proof module is configured to sign the voting state by using a signature generation function, to obtain the leader proof.

In some possible designs, when the first blockchain node is the follower, and when no flushing notification is received, the block generation module is configured to flush a third block to disk, where the third block is a block sent to the first blockchain node.

According to a third aspect, a computer program product is provided. When the computer program product is read and executed by a computer, the method according to any design of the first aspect is performed.

According to a fourth aspect, a computer non-transient storage medium is provided, including an instruction. When the instruction is run on a first lower-level node, the first lower-level node is enabled to perform the method according to any design of the first aspect.

According to a fifth aspect, a computing node is provided. The computing node includes a processor and a memory. The processor is configured to execute code in the memory to perform the method according to any design of the first aspect.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Figure 1:
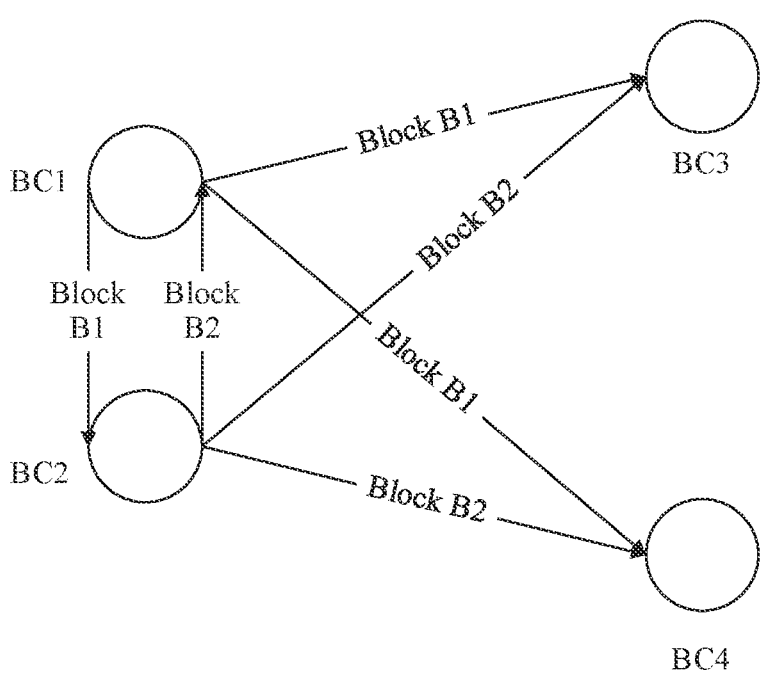
FIG. 1 is a schematic diagram of performing block generation by a blockchain node in an existing proof of elapsed time.

For ease of understanding, the following first describes in detail the lightweight terminal device in this application.

The lightweight terminal device may be a terminal device that can perform communication, has a relatively weak computing capability, can bear relatively low energy consumption, and has relatively low reliability, for example, a mobile phone, a tablet computer, an MP5, or a vehicle-mounted device. In the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but is used to implement a powerful function through software support, a data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs. These terminal devices usually have a relatively small volume and a processor with relatively low performance. Consequently, these terminal devices have a relatively weak computing capability and relatively low energy consumption. In addition, after these terminal devices are delivered from a factory, a user may randomly change an operating system, an application, and data. Therefore, these terminal devices have relatively low reliability.

However, a blockchain node in a blockchain system cannot use a lightweight device, in other words, a node that has the relatively low computing capability, can bear the relatively low energy consumption, and has relatively low reliability. Consequently, there is a great limitation on application of the blockchain.

The following describes in detail reasons why three existing consensus mechanisms cannot be applied to an existing lightweight terminal device.

(1) Proof-of-Work (PoW)

The blockchain system may determine, by using the PoW, which blockchain nodes have a block generation qualification. For example, for a basic character string "Hello, world!", the proof-of-work is to add an integer value to the end of the character string, and perform an SHA256 hash operation on a character string after the integer value is added. If an obtained hash (expressed in a hexadecimal format) starts with "0000", the verification is successful. To achieve this objective of the proof-of-work, the integer value needs to be continuously increased and the SHA256 hash operation needs to be performed on an obtained character string until a hash started with "0000" is obtained. Each blockchain node in the blockchain system performs the foregoing operation process, and the first node that obtains, through calculation, a hash started with "0000" has the block generation qualification. According to this rule, calculation for 4,251 times needs to be performed to find the hash started with "0000". It is clear that the foregoing is merely an example in a relatively simple manner. In actual application, a workload of the blockchain system is far more complex than that in this example, and usually $2^{\wedge}16$ (65,536) operations need to be performed.

When the consensus mechanism is the PoW, each blockchain node in the blockchain system needs to perform a large amount of computing. Therefore, the lightweight terminal device that has the relatively weak computing capability and can bear the relatively low energy consumption cannot be used.

(2) Proof of Elapsed Time (PoET)

The blockchain system may determine, by using the PoET, which blockchain nodes have the block generation qualification. The blockchain system includes a blockchain node BC1, a blockchain node BC2, a blockchain node BC3, and a blockchain node BC4. All blockchain nodes in the blockchain system have a timer, and the timer of each blockchain node generates a random waiting time period, and performs timing based on the generated random waiting time period. It is assumed that a random waiting time period on the blockchain node BC1 is 1 second, a random waiting time period on the blockchain node BC2 is 3 seconds, a random waiting time period on the blockchain node BC3 is 1 second, and a random waiting time period on the blockchain node BC4 is 5 seconds.

As shown in FIG. 1, the blockchain node BC1 and the blockchain node BC3 are the first batch of blockchain nodes on which the random waiting time period times out. If the blockchain node BC1 does not receive, within the entire random waiting time period, a block sent by another blockchain node, the blockchain node BC1 generates a block B1, and separately sends the block B1 to the blockchain node BC2, the blockchain node BC3, and the blockchain node BC4. In addition, if the blockchain node BC3 does not receive, within the entire random waiting time period, a block sent by another blockchain node, the blockchain node BC3 generates a block B2, and separately sends the block B2 to the blockchain node BC2, the blockchain node BC3, and the blockchain node BC4. Herein, the blockchain node BC1 and the blockchain node BC3 obtain the block generation qualification, and perform block generation at the same time. As a result, forking occurs in the blockchain system.

When the consensus mechanism is the PoET, a large quantity of blockchain nodes often obtain the block generation qualification at the same time. In addition, the large quantity of blockchain nodes send blocks at the same time, causing forking. Consequently, power consumption is relatively high. Therefore, the lightweight terminal device that has the relatively weak computing capability and can bear the relatively low energy consumption cannot be used.

(3) Raft Consensus Mechanism

1. The blockchain system determines, through an election process, which blockchain nodes obtain the block generation qualification. The election process is as follows.

Figures 2A, 2B, 2C:
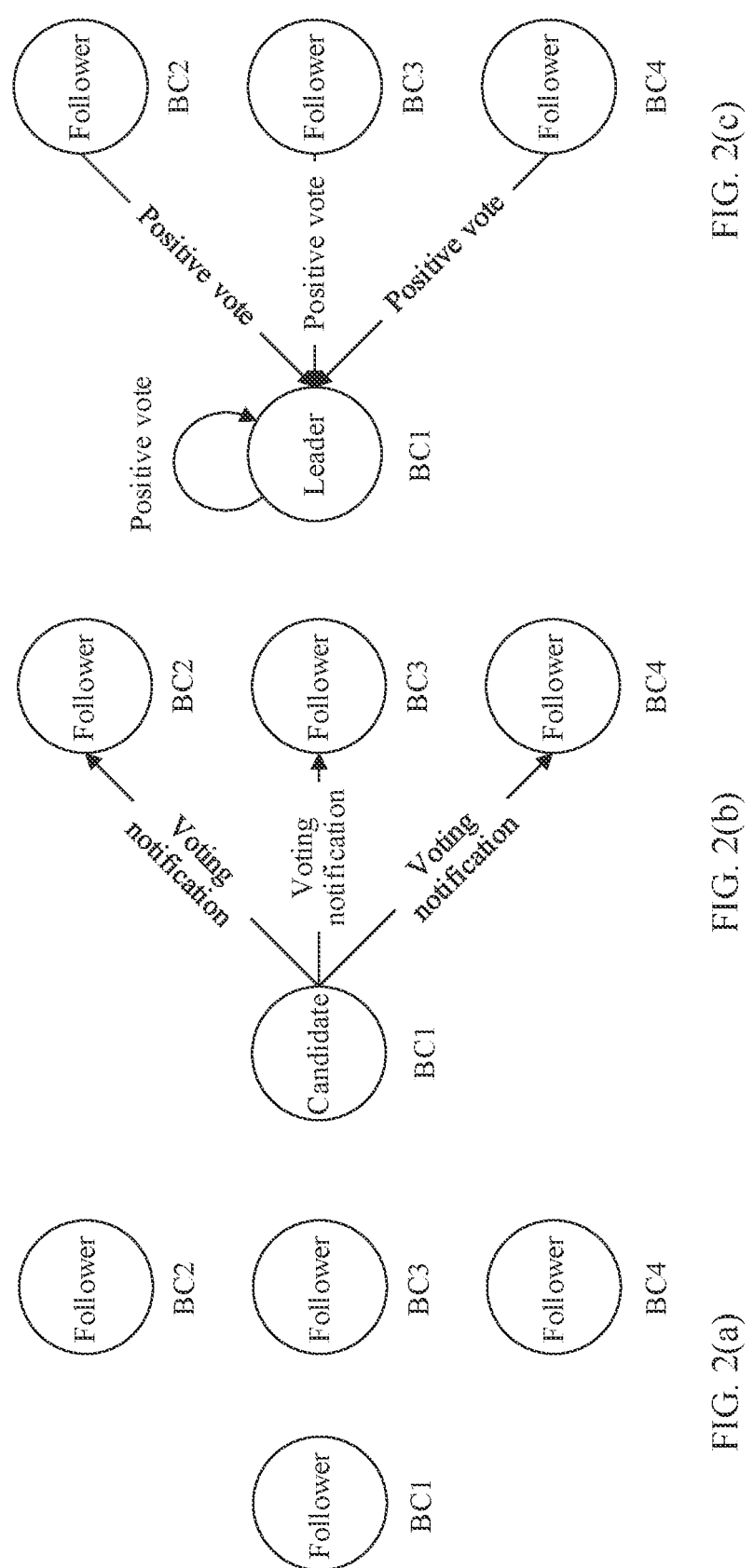
FIG. 2(a), FIG. 2(b), FIG. 2(c) are a schematic diagram of an election process in an existing raft consensus mechanism.

As shown in FIG. 2(a), initial states of all blockchain nodes in the blockchain system, including the blockchain node BC1, the blockchain node BC2, the blockchain node BC3, and the blockchain node BC4, are all "follower". All blockchain nodes in the blockchain system have a timer. A timer of each blockchain node generates a random waiting time period, and performs timing based on the generated random waiting time period. A random waiting time period on the blockchain node BC1 is 1 second, a random waiting time period on the blockchain node BC2 is 3 seconds, a random waiting time period on the blockchain node BC3 is 2 seconds, and a random waiting time period on the blockchain node BC4 is 2 seconds. All blockchain nodes in the blockchain system have a same term.

As shown in FIG. 2(h), the blockchain node BC1 is the first blockchain node on which the random waiting time period times out. If the blockchain node BC1 does not receive a heartbeat signal from a leader node in the current term within the entire random waiting time period, it indicates that there is no leader node. In this case, a state of the blockchain node BC1 changes from the follower to a candidate, a new term starts, in other words, the term is increased by 1, and the blockchain node BC1 votes for itself. Then, the blockchain node BC1 sends a voting notification to the blockchain node BC2, the blockchain node BC3, and the blockchain node BC4. The voting notification includes the term of the blockchain node BC1. In this case, terms of the blockchain node BC2, the blockchain node BC3, and the blockchain node BC4 remain unchanged.

As shown in FIG. 2(c), after receiving the voting notification, the blockchain node BC2 compares a term of the blockchain node BC2 with the term of the blockchain node BC1. If the term of the blockchain node BC1 is greater than the term of the blockchain node BC2, and the blockchain node BC2 has not cast a positive vote, the blockchain node BC2 sends a positive vote to the blockchain node BC1. Herein, the blockchain node BC2 sends the positive vote only once in a same term. In other words, after the blockchain node BC2 sends the positive vote to the blockchain node BC1, if the blockchain node BC2 receives the voting notification from another blockchain node, although a term
of the another blockchain node is greater than the term of the
blockchain node BC2, the blockchain node BC2 determines
that the blockchain node BC2 has cast the positive vote, and
the blockchain node BC2 sends a negative vote to the
another blockchain node. Similarly, the blockchain node
BC3 and the blockchain node BC4 perform the same opera-
tion. Details are not described herein again.

The blockchain node BC1 collects statistics on the
received votes. The blockchain node BC1 receives the
positive votes from the blockchain node BC1, the block-
chain node BC2, the blockchain node BC3, and the block-
chain node BC4, and does not receive the negative vote from
a blockchain node. When the blockchain node BC1 receives
positive votes from a half of nodes or more than half of
nodes, the state of the blockchain node BC1 changes from
the "candidate" to the "leader". Herein, the blockchain node
BC1 elected in a leader election process has the block
generation qualification.

The election process is described by using an example in
which there is no byzantine node in the blockchain system,
in other words, all blockchain nodes in the blockchain
system are trusted nodes, and there is no untrusted node.
However, when there is a byzantine node in the blockchain
system, a vulnerability may occur. It is assumed that the
blockchain node BC2 is the byzantine node, and the leader
election process may have the following a plurality of
vulnerabilities. The following separately describes the vul-
nerabilities in detail.

In a first case, the blockchain node BC2 is elected as the
leader by forging the random waiting time period, and
maliciously causes forking. Details are as follows.

Figures 3A, 3B, 3C:
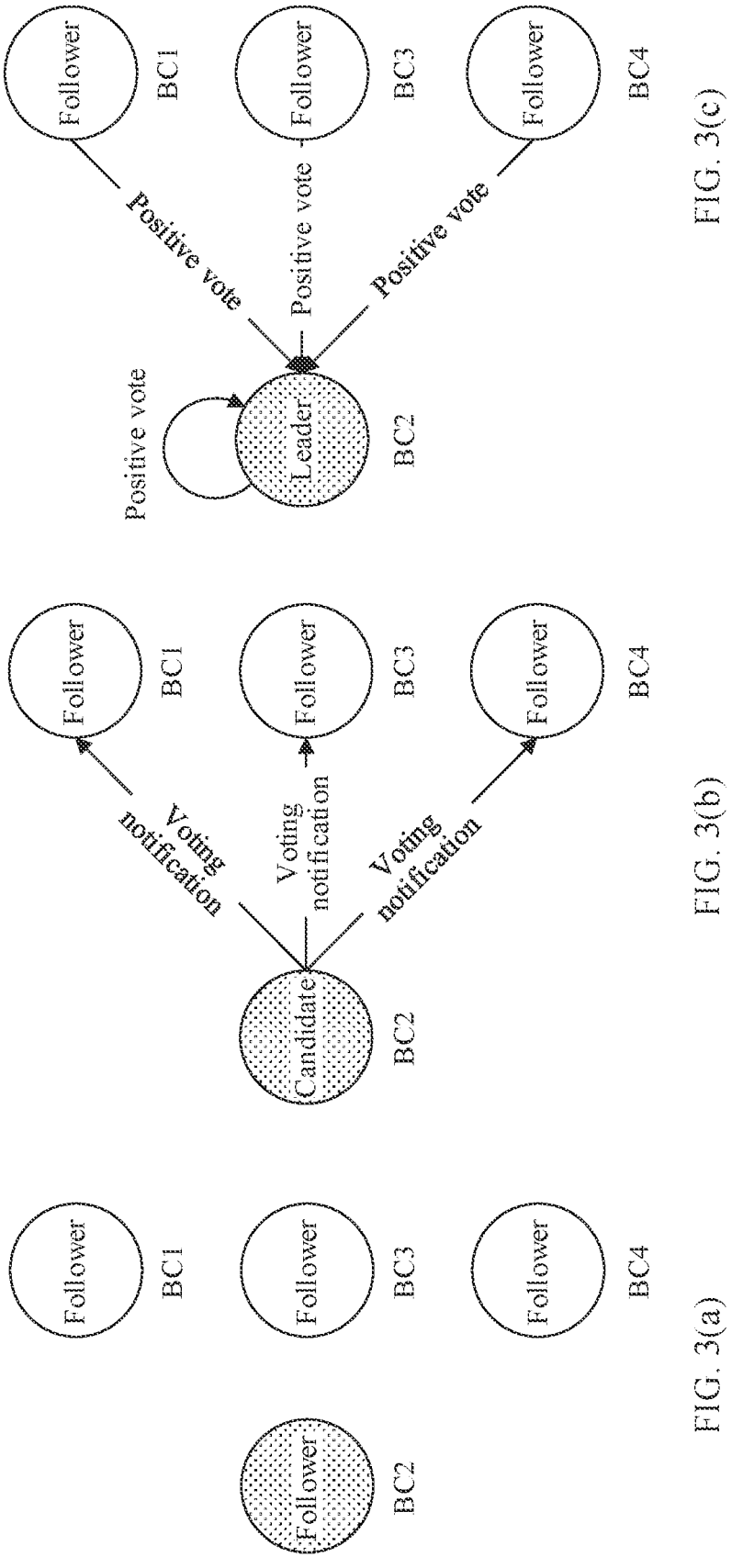
FIG. 3(a), FIG. 3(b), FIG. 3(c) are a schematic diagram of a process in which a blockchain node BC2 in an existing raft consensus mechanism forges a random waiting time period to be elected as a leader in an election process.

As shown in FIG. 3(a), the initial states of all the
blockchain nodes in the blockchain system, including the
blockchain node BC1, the blockchain node BC2, the block-
chain node BC3, and the blockchain node BC4, are all
"follower". All blockchain nodes in the blockchain system
have a timer. A timer of each blockchain node generates a
random waiting time period, and performs timing based on
the generated random waiting time period. A random wait-
ing time period on the blockchain node BC1 is 1 second, a
random waiting time period on the blockchain node BC2 is
3 seconds, a random waiting time period on the blockchain
node BC3 is 2 seconds, and a random waiting time period on
the blockchain node BC4 is 2 seconds. Herein, the block-
chain node BC2 is the byzantine node. Therefore, the
blockchain node BC2 changes the random waiting time
period of the blockchain node BC2 to 0 seconds. All
blockchain nodes in the blockchain system have a same
term.

As shown in FIG. 3(b), the blockchain node BC2 is the
first blockchain node on which the waiting time period times
out, the blockchain node BC2 does not receive a heartbeat
signal from a leader node in the current term within the
entire random waiting time period, it indicates that there is
no leader node. In this case, a state of the blockchain node
BC2 changes from the follower to a candidate, a new term
starts, in other words, the term is increased by 1, and the
blockchain node BC2 votes for itself. Then, the blockchain
node BC2 sends a voting notification to the blockchain node
BC1, the blockchain node BC3, and the blockchain node
BC4. The voting notification includes the term of the block-
chain node BC2.

As shown in FIG. 3(c), after receiving the voting notifi-
cation, the blockchain node BC1 compares a term of the
blockchain node BC1 with the term of the blockchain node
BC2, if the term of the blockchain node BC2 is greater than the term of the blockchain node BC1, and the blockchain
node BC1 has not cast a positive vote, the blockchain node
BC1 sends the positive vote to the blockchain node BC2.
Herein, the blockchain node BC1 sends the positive vote
only once in a same term. In other words, after the block-
chain node BC1 sends the positive vote to the blockchain
node BC2, if the blockchain node BC1 receives the voting
notification from another blockchain node, although a term
of the another blockchain node is greater than the term of the
blockchain node BC1, the blockchain node BC1 determines
that the blockchain node BC1 has cast the positive vote, and
the blockchain node BC1 sends a negative vote to the
another blockchain node. Similarly, the blockchain node
BC3 and the blockchain node BC4 perform the same opera-
tion. Details are not described herein again.

The blockchain node BC2 collects statistics on the
received votes. The blockchain node BC2 receives votes
from the blockchain node BC1, the blockchain node BC2,
the blockchain node BC3, and the blockchain node BC4, and
does not receive a negative vote from a blockchain node.
When the blockchain node BC2 receives votes from a half
of nodes or more than half of nodes, the state of the
blockchain node BC2 changes from the "candidate" to the
"leader". Herein, the blockchain node BC2 elected in a
leader election process has the block generation qualifica-
tion.

However, the blockchain node BC2 is the byzantine node.
After obtaining the block generation qualification, the block-
chain node BC2 may send different blocks to different
blockchain nodes. This maliciously causes forking.

In a second case, the blockchain node BC2 forges a last
block hash, is elected as the leader, and maliciously causes
forking. Details are as follows.

As shown in FIG. 3(a), the initial states of all the
blockchain nodes in the blockchain system, including the
blockchain node BC1, the blockchain node BC2, the block-
chain node BC3, and the blockchain node BC4, are all
"follower". All blockchain nodes in the blockchain system
have a timer. A timer of each blockchain node generates a
random waiting time period based on the last block hash,
and performs timing based on the generated random waiting
time period. A random waiting time period on the blockchain
node BC1 is 2 seconds, a random waiting time period on the
blockchain node BC2 is 3 seconds, a random waiting time
period on the blockchain node BC3 is 2 seconds, and a
random waiting time period on the blockchain node BC4 is
2 seconds. Herein, the blockchain node BC2 is a byzantine
node. Therefore, when the blockchain node BC2 considers
that the random waiting time period is relatively long, the
blockchain node BC2 changes a value of the last block hash.
In this case, the blockchain node BC2 regenerates a random
waiting time period, and the foregoing process is repeated,
until the blockchain node BC2 obtains a relatively short
random waiting time period, for example, 1 second. All
blockchain nodes in the blockchain system have a same
term.

As shown in FIG. 3(b), the blockchain node BC2 is the
first blockchain node on which the waiting time period times
out. If the blockchain node BC2 does not receive a heartbeat
signal from a leader node in the current term within the
entire random waiting time period, it indicates that there is
no leader node. In this case, a state of the blockchain node
BC2 changes from the follower to a candidate, a new term
starts, in other words, the term is increased by 1, and the
blockchain node BC2 votes for itself. Then, the blockchain
node BC2 sends a voting notification to the blockchain node BC1, the blockchain node BC3, and the blockchain node BC4. The voting notification includes the term of the blockchain node BC2.

As shown in FIG. 3(c), after receiving the voting notification, the blockchain node BC1 compares a term of the blockchain node BC1 with the term of the blockchain node BC2, if the term of the blockchain node BC2 is greater than the term of the blockchain node BC1, and the blockchain node BC1 has not cast a positive vote, the blockchain node BC1 sends the positive vote to the blockchain node BC2. Herein, the blockchain node BC1 sends the positive vote only once in a same term. In other words, after the blockchain node BC1 sends the positive vote to the blockchain node BC2, if the blockchain node BC1 receives the voting notification from another blockchain node, although a term of the another blockchain node is greater than the term of the blockchain node BC1, the blockchain node BC1 determines that the blockchain node BC1 has cast the positive vote, and the blockchain node BC1 sends a negative vote to the another blockchain node. Similarly, the blockchain node BC3 and the blockchain node BC4 perform the same operation. Details are not described herein again.

The blockchain node BC2 collects statistics on the received votes. The blockchain node BC2 receives votes from the blockchain node BC1, the blockchain node BC3, and the blockchain node BC4, and does not receive a negative vote from a blockchain node. When the blockchain node BC2 receives votes from a half of nodes or more than half of nodes, the state of the blockchain node BC2 changes from the "candidate" to the "leader". Herein, the blockchain node BC2 elected in a leader election process has the block generation qualification.

However, the blockchain node BC2 is the byzantine node. After obtaining the block generation qualification, the blockchain node BC2 may send different blocks to different blockchain nodes. This maliciously causes forking.

In a third case, the blockchain node BC2 changes a term and votes for a plurality of times to select a plurality of leaders. This maliciously causes forking. Details are as follows.

Figures 4A, 4B, 4C:
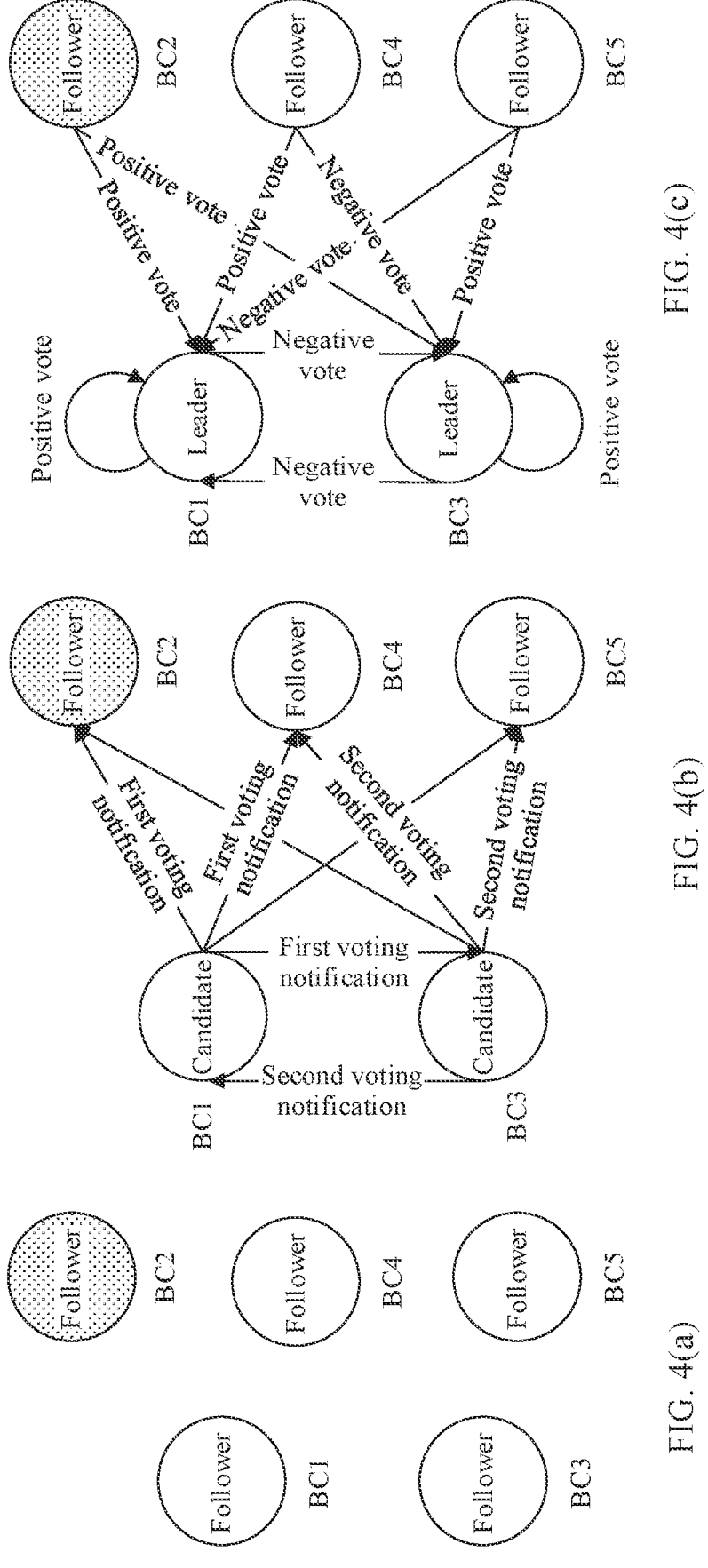
FIG. 4(a), FIG. 4(b), FIG. 4(c) are a schematic diagram of a process in which a blockchain node BC2 in an existing raft consensus mechanism changes a term in an election process and votes for a plurality of times to select a plurality of leaders.

As shown in FIG. 4(a), initial states of all blockchain nodes in a blockchain system, including a blockchain node BC1, a blockchain node BC2, a blockchain node BC3, a blockchain node BC4, and a blockchain node BC5, are all "follower". All blockchain nodes in the blockchain system have a timer. A timer of each blockchain node generates a random waiting time period, and performs timing based on the generated random waiting time period. A random waiting time period on the blockchain node BC1 is 1 second, a random waiting time period on the blockchain node BC2 is 3 seconds, a random waiting time period on the blockchain node BC3 is 1 second, a random waiting time period on the blockchain node BC4 is 4 seconds, and a random waiting time period on the blockchain node BC5 is 6 seconds. All blockchain nodes in the blockchain system have a same term, As shown in FIG. 4(b), the blockchain node BC1 and the blockchain node BC3 are the first batch of blockchain nodes on which the waiting time times out at the same time. If the blockchain node BC1 does not receive a heartbeat signal from a leader node in the current term within the entire random waiting time period, it indicates that there is no leader node. In this case, a state of the blockchain node BC1 changes from the follower to a candidate, a new term starts, in other words, the term is increased by 1, and the blockchain node BC1 votes for itself. Then, the blockchain node BC1 sends a first voting notification to the blockchain node BC2, the blockchain node BC3, the blockchain node BC4, and the blockchain node BC5. The first voting notification includes the term of the blockchain node BC1. Similarly, the blockchain node BC3 sends a second voting notification to the blockchain node BC1, the blockchain node BC2, the blockchain node BC4, and the blockchain node BC5.

As shown in FIG. 4(c), after receiving the second voting notification sent by the blockchain node BC3, the blockchain node BC1 compares the term of the blockchain node BC1 with a term of the blockchain node BC3. Because the term of the blockchain node BC1 is the same as the term of the blockchain node BC3, the blockchain node BC1 sends a negative vote to the blockchain node BC3.

The blockchain node BC2 is a byzantine node. After receiving the first voting notification sent by the nearest blockchain node BC1, the blockchain node BC2 first compares the term of the blockchain node BC1 with the term of the blockchain node BC2. Because the term of the blockchain node BC2 is greater than the term of the blockchain node BC1, and the blockchain node BC1 has not cast a positive vote during the term, the blockchain node BC1 sends the positive vote to the blockchain node BC2. After receiving the second voting notification sent by the farthest blockchain node BC3, the blockchain node BC2 forges the term of the blockchain node BC3, increases the term of the blockchain node BC3 by 1, and compares the term of the blockchain node BC3 with the term of the blockchain node BC2. Because the term of the blockchain node BC3 is greater than the term forged by the blockchain node BC2, and the blockchain node BC2 has not cast a positive vote during the term, the blockchain node BC2 sends the positive vote to the blockchain node BC3.

After receiving the first voting notification sent by the nearest blockchain node BC1, the blockchain node BC4 first compares a term of the blockchain node BC4 with the term of the blockchain node BC1. Because the term of the blockchain node BC1 is greater than the term of the blockchain node BC4, and the blockchain node BC4 has not cast a positive vote, the blockchain node BC4 sends the positive vote to the blockchain node BC1. Then, after receiving the second voting notification sent by the farthest blockchain node BC3, the blockchain node BC4 compares a term of the blockchain node BC4 with the term of the blockchain node BC3. Although the term of the blockchain node BC3 is greater than the term of the blockchain node BC4, the blockchain node BC4 has cast a positive vote. Therefore, the blockchain node BC4 sends the negative vote to the blockchain node BC3.

After receiving the second voting notification sent by the nearest blockchain node BC3, the blockchain node BC5 first compares a term of the blockchain node BC5 with the term of the blockchain node BC3. Because the term of the blockchain node BC3 is greater than the term of the blockchain node BC5, and the blockchain node BC5 has not cast a positive vote, the blockchain node BC5 sends the positive vote to the blockchain node BC3. Then, after receiving the first voting notification sent by the farthest blockchain node BC1, the blockchain node BC5 compares the term of the blockchain node BC5 with the term of the blockchain node BC1. Although the term of the blockchain node BC1 is greater than the term of the blockchain node BC5, the blockchain node BC5 has cast a positive vote. Therefore, the blockchain node BC5 sends the negative vote to the blockchain node BC1.

The blockchain node BC1 collects statistics on the received votes. The blockchain node BC1 receives the positive votes sent by a half of the nodes or more than half of the nodes. Therefore, the state of the blockchain node BC1 changes from the "candidate" to the "leader". The blockchain node BC3 collects statistics on the received votes. The blockchain node BC3 receives the positive votes sent by a half of the nodes or more than half of the nodes. Therefore, the state of the blockchain node BC3 changes from the "candidate" to the "leader".

Herein, the blockchain node BC1 and the blockchain node BC3 that are elected in a leader election process have the block generation qualification. This maliciously causes forking.

In a fourth case, the blockchain node BC2 forges the voting notification to become the leader and maliciously cause forking. Details are as follows.

Figures 5A, 5B, 5C:
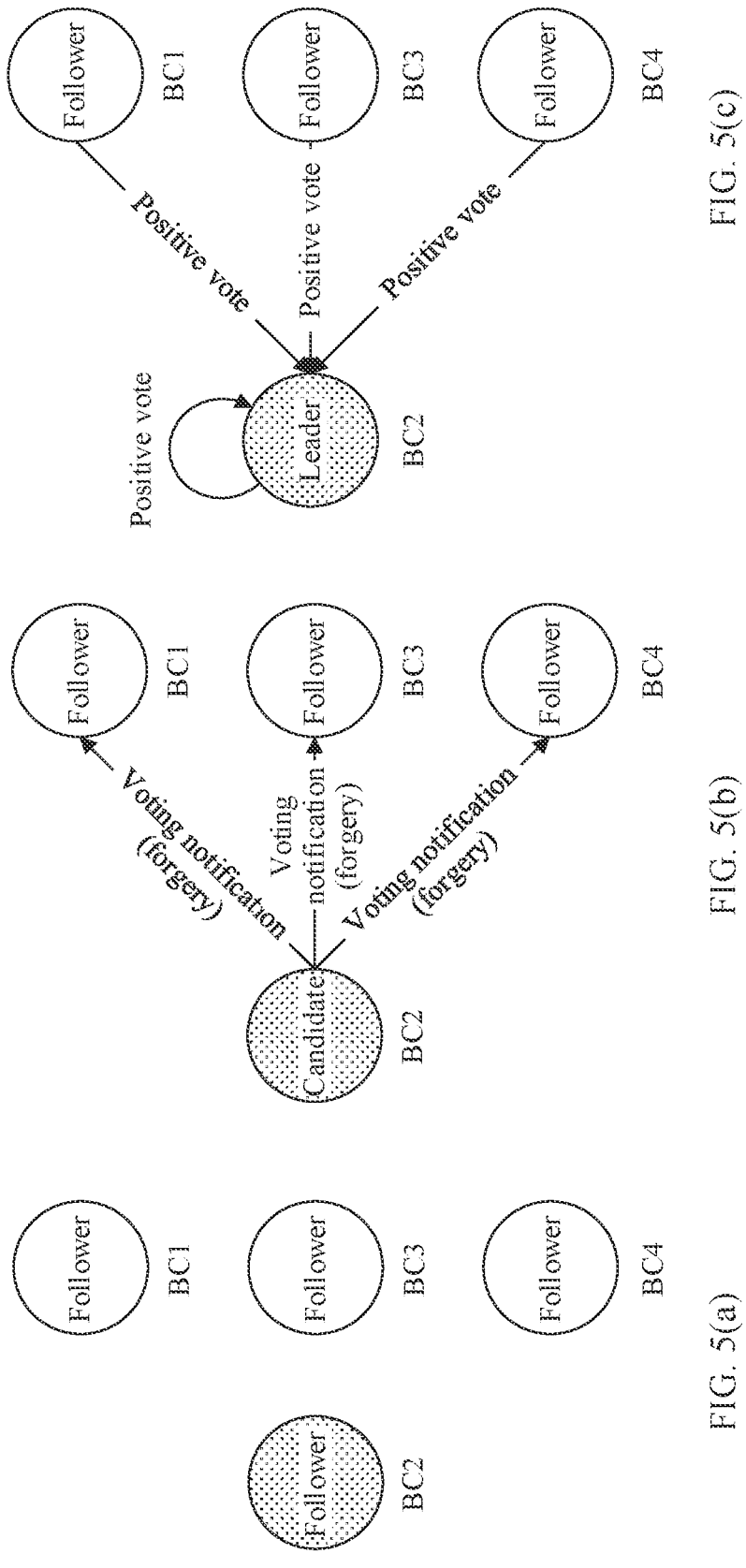
FIG. 5(a), FIG. 5(b), FIG. 5(c) are a schematic diagram of a process in which a blockchain node BC2 in an existing raft consensus mechanism forges a voting notification and is elected as a leader in an election process.

As shown in FIG. 5(a), initial states of all blockchain nodes in the blockchain system, including a blockchain node BC1, a blockchain node BC2, a blockchain node BC3, and a blockchain node BC4, are all "follower". All blockchain nodes in the blockchain system have a tinier. A timer of each blockchain node generates a random waiting time period, and performs timing based on the generated random waiting time period. A random waiting time period on the blockchain node BC1 is 1 second, a random waiting time period on the blockchain node BC2 is 3 seconds, a random waiting time period on the blockchain node BC3 is 2 seconds, and a random waiting time period on the blockchain node BC4 is 2 seconds. All blockchain nodes in the blockchain system have a same term.

As shown in FIG. 5(b), the blockchain node BC2 forges the voting notification at an initial moment at which the random waiting time period starts to be counted, and sends the voting notification to the blockchain node BC1, the blockchain node BC3, and the blockchain node BC4. The voting notification includes a value obtained by adding 1 to a term of the blockchain node BC2.

After receiving the voting notification, the blockchain node BC1 compares a term of the blockchain node BC1 with the term of the blockchain node BC2. Because the term of the blockchain node BC2 is greater than the term of the blockchain node BC1, and the blockchain node BC1 has not cast a positive vote, the blockchain node BC1 sends the positive vote to the blockchain node BC2. Similarly, the blockchain node BC3 and the blockchain node BC4 perform the same operation. Details are not described herein again.

After the random waiting time period of the blockchain node BC2 times out, the blockchain node BC2 does not receive a heartbeat signal from a leader node in the current term in the entire random waiting time period, and it indicates that there is no leader node. A state of the blockchain node BC2 changes front the "follower" to a "candidate", a new term starts, in other words, the term is increased by 1, and the blockchain node BC2 votes for itself.

As shown in FIG. 5(c), the blockchain node BC2 collects statistics on the received votes. The blockchain node BC2 receives the positive votes from the blockchain node BC1, the blockchain node BC2, the blockchain node BC3, and the blockchain node BC4, and does not receive a negative vote from a blockchain node. When the blockchain node BC2 receives positive votes from a half of nodes or more than half of nodes, the state of the blockchain node BC2 changes from the "candidate" to the "leader". Herein, the blockchain node BC2 elected in a leader election process has the block generation qualification.

However, the blockchain node BC2 is the byzantine node. After obtaining the block generation qualification, the blockchain node BC2 may send different blocks to different blockchain nodes. This maliciously causes forking.

In a fifth case, the blockchain node BC2 forges the voting to become the leader and maliciously cause forking. Details are as follows.

Figures 6A, 6B, 6C:
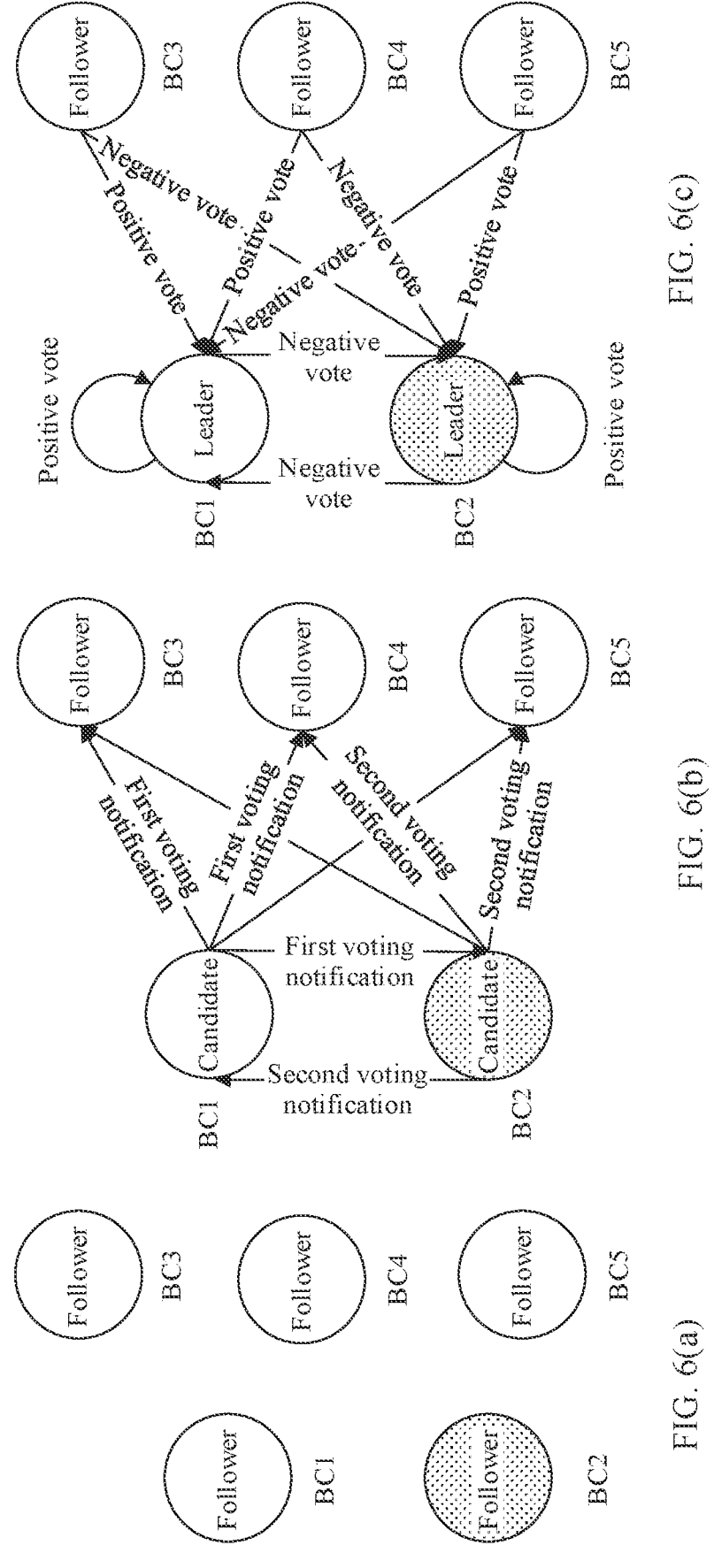
FIG. 6(a), FIG. 6(b), FIG. 6(c) are a schematic diagram of a process in which a blockchain node BC2 in an existing raft consensus mechanism forges voting and is elected as a leader in an election process.

As shown in FIG. 6(a), initial states of all blockchain nodes in a blockchain system including a blockchain node BC1, a blockchain node BC2, a blockchain node BC3, a blockchain node BC4, and a blockchain node BC5, are all "follower". All blockchain nodes in the blockchain system have a timer. A timer of each blockchain node generates a random waiting time period, and performs timing based on the generated random waiting time period. A random waiting time period on the blockchain node BC1 is 1 second, a random waiting time period on the blockchain node BC2 is 1 second, a random waiting time period on the blockchain node BC3 is 3 seconds, a random waiting time period on the blockchain node BC4 is 4 seconds, and a random waiting time period on the blockchain node BC5 is 6 seconds. All blockchain nodes in the blockchain system have a same term.

As shown in FIG. 6(b), the blockchain node BC1 and the blockchain node BC2 are the first batch of blockchain nodes on which the waiting time times out at the same time. If the blockchain node BC1 does not receive a heartbeat signal from a leader node in the current term within the entire random waiting time period, it indicates that there is no leader node. In this case, a state of the blockchain node BC1 changes from the follower to a candidate, a new term starts, in other words, the term is increased by 1, and the blockchain node BC1 votes for itself. Then, the blockchain node BC1 sends a first voting notification to the blockchain node BC2, the blockchain node BC3, the blockchain node BC4, and the blockchain node BC5. The first voting notification includes a term of the blockchain node BC1. Similarly, the blockchain node BC2 sends a second voting notification to the blockchain node BC1, the blockchain node BC3, the blockchain node BC4, and the blockchain node BC5.

As shown in FIG. 6(c), after receiving the first voting notification sent by the nearest blockchain node BC1, the blockchain node BC3 first compares a term of the blockchain node BC3 with the term of the blockchain node BC1. Because the term of the blockchain node BC1 is greater than the term of the blockchain node BC3, and the blockchain node BC3 has not cast a positive vote, the blockchain node BC3 sends the positive vote to the blockchain node BC1. Then, after receiving the second voting notification sent by the farthest blockchain node BC2, the blockchain node BC3 compares the term of the blockchain node BC3 with the term of the blockchain node BC2. Although the term of the blockchain node BC2 is greater than the term of the blockchain node BC1, the blockchain node BC3 has cast a positive vote. Therefore, the blockchain node BC3 sends a negative vote to the blockchain node BC2.

After receiving the first voting notification sent by the nearest blockchain node BC1, the blockchain node BC4 first compares a term of the blockchain node BC4 with the term of the blockchain node BC1 Because the term of the blockchain node BC1 is greater than the term of the blockchain node BC4, and the blockchain node BC4 has not cast a positive vote, the blockchain node BC4 sends the positive vote to the blockchain node BC1. Then, after receiving the second voting notification sent by the farthest blockchain node BC2, the blockchain node BC4 compares the term of the blockchain node BC4 with the term of the blockchain node BC2. Although the term of the blockchain node BC2 is greater than the term of the blockchain node BC4, the blockchain node BC4 has cast a positive vote. Therefore, the blockchain node BC4 sends the negative vote to the blockchain node BC2.

After receiving the second voting notification sent by the nearest blockchain node BC2, the blockchain node BC5 first compares a term of the blockchain node BC5 with the term of the blockchain node BC2. Because the term of the blockchain node BC2 is greater than the term of the blockchain node BC5, and the blockchain node BC5 has not cast a positive vote, the blockchain node BC5 sends the positive vote to the blockchain node BC2. Then, after receiving the first voting notification sent by the farthest blockchain node BC1, the blockchain node BC5 compares the term of the blockchain node BC5 with the term of the blockchain node BC1. Although the term of the blockchain node BC1 is greater than the term of the blockchain node BC5, the blockchain node BC5 has cast a positive vote. Therefore, the blockchain node BC5 sends the negative vote to the blockchain node BC1.

The blockchain node BC1 collects statistics on the received votes. The blockchain node BC1 receives the positive votes sent by a half of the nodes or more than half of the nodes. Therefore, the state of the blockchain node BC1 changes from the "candidate" to the "leader". The blockchain node BC2 collects statistics on the received votes. The blockchain node BC2 forges the negative votes sent by the blockchain node BC3 and the blockchain node BC4 into the positive votes. The blockchain node BC2 receives the positive votes sent by a half of the nodes or more than half of the nodes. Therefore, the state of the blockchain node BC2 changes from the "candidate" to the "leader".

Herein, the blockchain node BC1 and the blockchain node BC2 that are elected in a leader election process have the block generation qualification. This maliciously causes forking.

In a sixth case, the blockchain node BC2 forges a quantity of votes to become the leader and maliciously cause forking. Details are as follows.

As shown in FIG. 6(a), initial states of all blockchain nodes in a blockchain system, including a blockchain node BC1, a blockchain node BC2, a blockchain node BC3, a blockchain node BC4, and a blockchain node BC5, are all "follower". All blockchain nodes in the blockchain system have a timer. A timer of each blockchain node generates a random waiting time period, and performs timing based on the generated random waiting time period. A random waiting time period on the blockchain node BC1 is 1 second, a random waiting time period on the blockchain node BC2 is 1 second, a random waiting time period on the blockchain node BC3 is 3 seconds, a random waiting time period on the blockchain node BC4 is 4 seconds, and a random waiting time period on the blockchain node BC5 is 6 seconds. All blockchain nodes in the blockchain system have a same term.

As shown in FIG. 6(b), the blockchain node BC1 and the blockchain node BC2 are the first batch of blockchain nodes on which the waiting time times out at the same time. If the blockchain node BC1 does not receive a heartbeat signal from a leader node in the current term within the entire random waiting time period, it indicates that there is no leader node. In this case, a state of the blockchain node BC1 changes from the follower to a candidate, a new term starts, in other words, the term is increased by 1, and the blockchain node BC1 votes for itself. Then, the blockchain node BC1 sends a first voting notification to the blockchain node BC2, the blockchain node BC3, the blockchain node BC4, and the blockchain node BC5. The first voting notification includes a term of the blockchain node BC1. Similarly, the blockchain node BC2 sends a second voting notification to the blockchain node BC1, the blockchain node BC3, the blockchain node BC4, and the blockchain node BC5.

As shown in FIG. 6(c), after receiving the first voting notification sent by the nearest blockchain node BC1, the blockchain node BC3 first compares a term of the blockchain node BC3 with the term of the blockchain node BC1. Because the term of the blockchain node BC1 is greater than the term of the blockchain node BC3, and the blockchain node BC3 has not cast a positive vote, the blockchain node BC3 sends the positive vote to the blockchain node BC1. Then, after receiving the second voting notification sent by the farthest blockchain node BC2, the blockchain node BC3 compares the term of the blockchain node BC3 with the term of the blockchain node BC2. Although the term of the blockchain node BC2 is greater than the term of the blockchain node BC1, the blockchain node BC3 has cast a positive vote. Therefore, the blockchain node BC3 sends a negative vote to the blockchain node BC2.

After receiving the first voting notification sent by the nearest blockchain node BC1, the blockchain node BC4 first compares a term of the blockchain node BC4 with the term of the blockchain node BC1. Because the term of the blockchain node BC1 is greater than the term of the blockchain node BC4, and the blockchain node BC4 has not cast a positive vote, the blockchain node BC4 sends the positive vote to the blockchain node BC1. Then, after receiving the second voting notification sent by the farthest blockchain node BC2, the blockchain node BC4 compares the term of the blockchain node BC4 with the term of the blockchain node BC2. Although the term of the blockchain node BC2 is greater than the term of the blockchain node BC4, the blockchain node BC4 has cast a positive vote. Therefore, the blockchain node BC4 sends the negative vote to the blockchain node BC2.

After receiving the second voting notification sent by the nearest blockchain node BC2, the blockchain node BC5 first compares a term of the blockchain node BC5 with the term of the blockchain node BC2. Because the term of the blockchain node BC2 is greater than the term of the blockchain node BC5, and the blockchain node BC5 has not cast a positive vote, the blockchain node BC5 sends the positive vote to the blockchain node BC2. Then, after receiving the first voting notification sent by the farthest blockchain node BC1, the blockchain node BC5 compares the term of the blockchain node BC5 with the term of the blockchain node BC1. Although the term of the blockchain node BC1 is greater than the term of the blockchain node BC5, the blockchain node BC5 has cast a positive vote. Therefore, the blockchain node BC5 sends the negative vote to the blockchain node BC1.

The blockchain node BC1 collects statistics on the received votes. The blockchain node BC1 receives the positive votes sent by a half of the nodes or more than half of the nodes. Therefore, the state of the blockchain node BC1 changes from the "candidate" to the "leader". The blockchain node BC2 collects statistics on the received votes. Although the blockchain node BC2 does not receive the positive votes sent by the half of the nodes or more than half of the nodes, the blockchain node BC2 forges that the positive votes sent by the half of the nodes or more than half of the nodes are received. Therefore, the state of the blockchain node BC2 changes from the "candidate" to the "leader".

Herein, the blockchain node BC1 and the blockchain node BC2 that are elected in a leader election process have the block generation qualification. This maliciously causes forking.

2. The blockchain system determines, through a block synchronization process, how to flush a generated block to a disk. After the blockchain node BC1 has the block generation qualification, a block synchronization process is as follows.

Figures 7A, 7B, 7C:
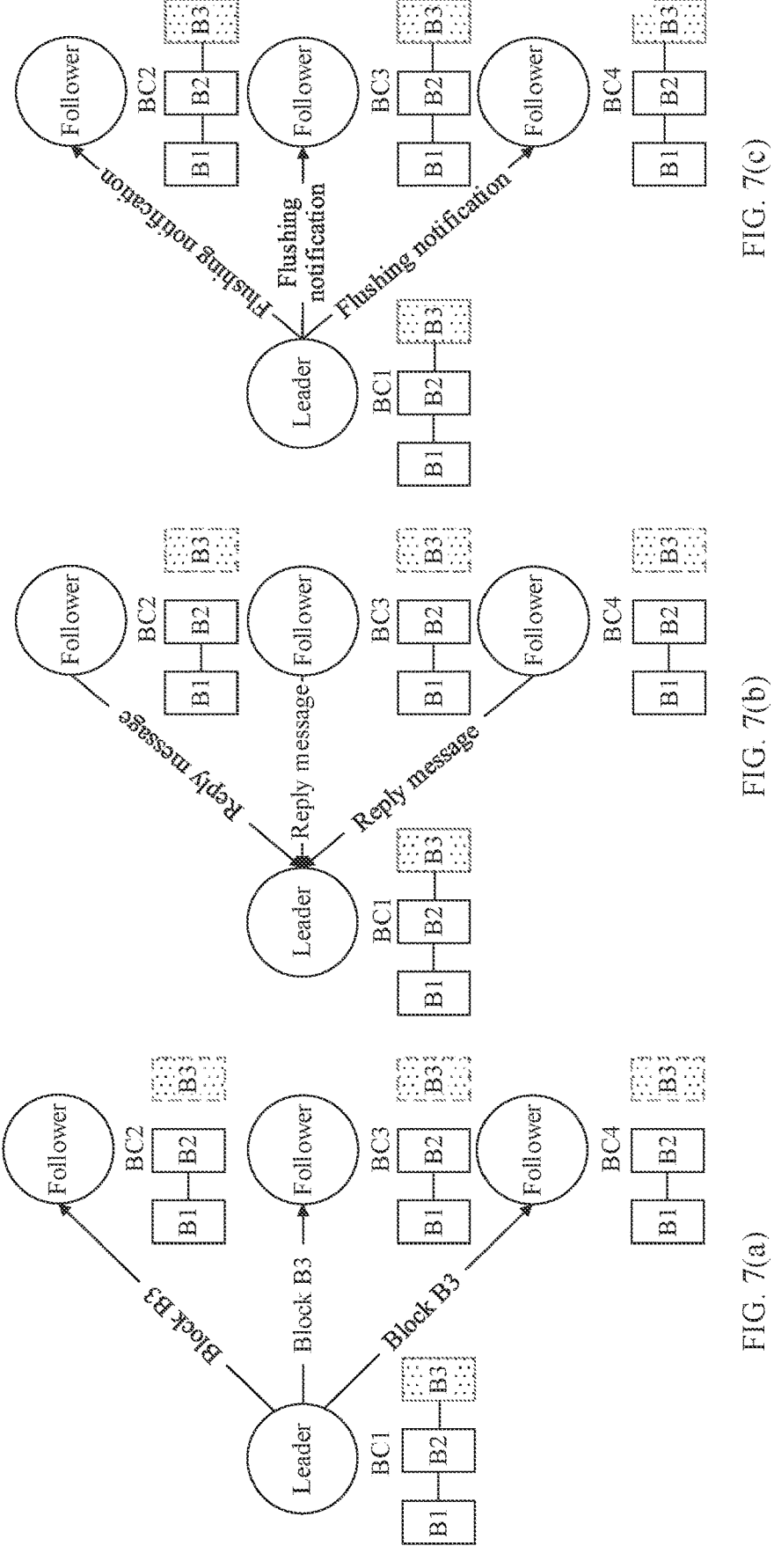
FIG. 7(a), FIG. 7(b), FIG. 7(c) are a schematic diagram of a block synchronization process in an existing raft consensus mechanism.

As shown in FIG. 7(a), the blockchain node BC1 (a leader) has a block B1 and a block B2 in an original blockchain, and the blockchain node BC1 packs collected transactions into a block B3, and inserts the block B3 behind the block B2 of the blockchain of the blockchain node BC1. Then, the blockchain node BC1 sends the block B3 to a blockchain node BC2 (a follower), a blockchain node BC3 (a follower), and a blockchain node BC4 (a follower).

As shown in FIG. 7(b), after receiving the block B3, the blockchain node BC2 sends a reply message to the blockchain node BC1 Similarly, the blockchain node BC3 and the blockchain node BC4 also perform a same operation.

As shown in FIG. 7(c), if the blockchain node BC1 receives the reply messages from the blockchain node BC2, the blockchain node BC3, and the blockchain node BC4, the blockchain node BC1 sends a flushing message to the blockchain node BC2, to indicate the blockchain node BC2 to flush the block B3 to a disk. After the blockchain node BC2 receives the flushing message, the blockchain node BC2 inserts the received block B3 behind the block B2 of the blockchain of the blockchain node BC2. The blockchain node BC3 and the blockchain node BC4 perform the similar operation.

The block synchronization process is described by using an example in which there is no byzantine node in the blockchain system, in other words, all blockchain nodes in the blockchain system are trusted nodes, and there is no untrusted node. However, when there is a byzantine node in the blockchain system, a vulnerability may occur. If the blockchain node BC2 is the byzantine node, the foregoing block synchronization process may have the following vulnerability.

The block chain node BC2 is elected as the leader. Then, two different blocks are generated in a same block height in the block synchronization process, to maliciously cause forking. Details are as follows.

As shown in HG. 8(a), a blockchain node BC2 (a leader) has a block B1 and a block B2 in an original blockchain, and the blockchain node BC2 packs collected transactions into a block B3, and inserts the block B3 behind the block B2 of the blockchain of the blockchain node BC2. Then, the blockchain node BC2 sends the block B3 to a blockchain node BC1 (a follower), a blockchain node BC3 (a follower), and a blockchain node BC4 (a follower).

Figures 8A, 8B, 8C:
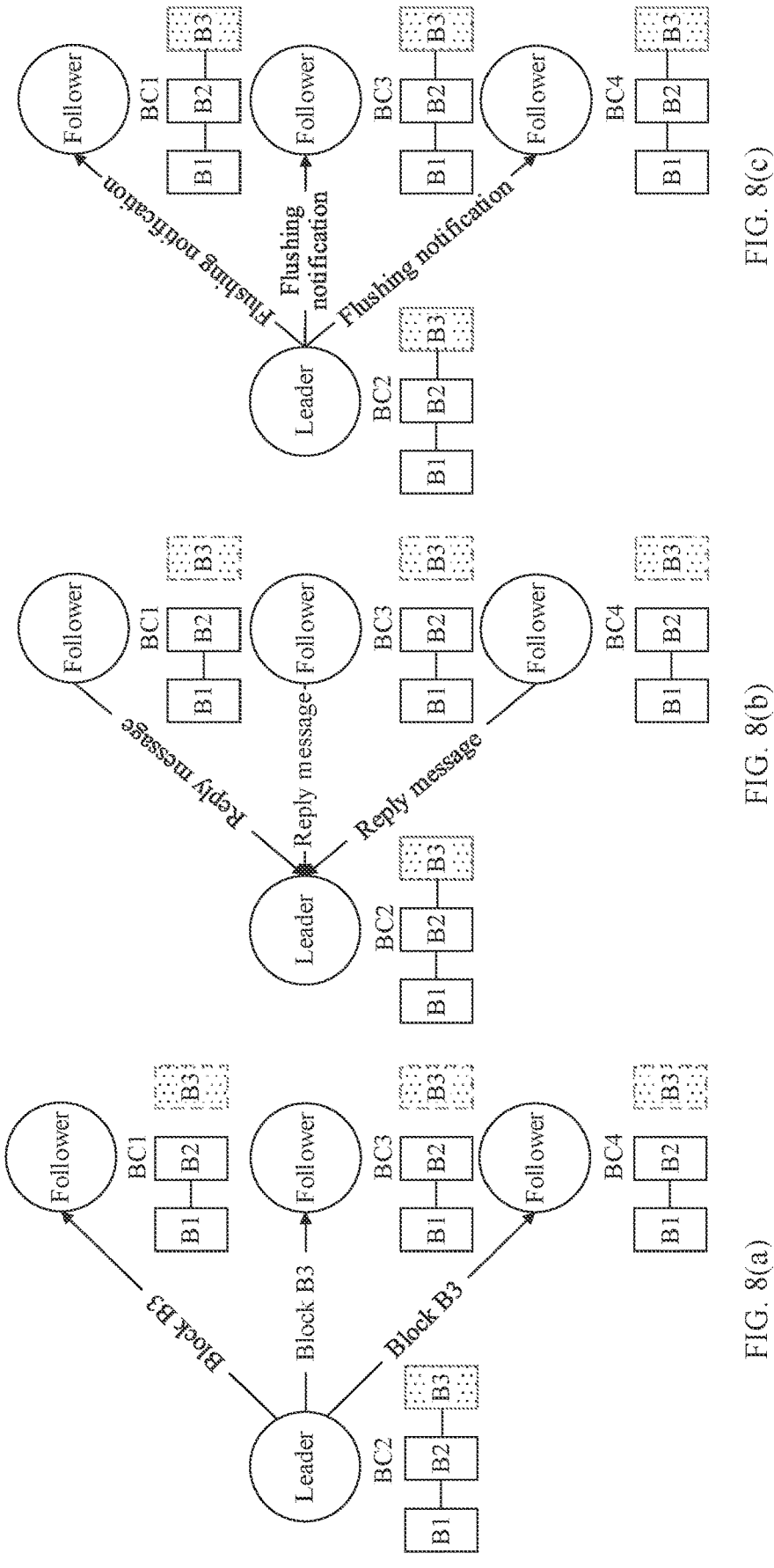
FIG. 8(a), FIG. 8(b), FIG. 8(c), FIG. 8(d), FIG. 8(e), FIG. 8(f) are a schematic diagram of a process in which a blockchain node BC2 in an existing raft consensus mechanism generates a block for a plurality of times in a same block height and forking is caused in a block synchronization process.

As shown in FIG. 8(b), after receiving the block B3, the blockchain node BC1 sends a reply message to the blockchain node BC2. Similarly, the blockchain node BC3 and the blockchain node BC4 also perform a same operation.

As shown in FIG. 8(c), if the blockchain node BC2 receives the reply messages from the blockchain node BC1, the blockchain node BC3, and the blockchain node BC4, the blockchain node BC2 sends a flushing message to the blockchain node BC1, to indicate the blockchain node BC1 to flush the block B3 to a disk. After the blockchain node BC1 receives the flushing message, the blockchain node BC1 inserts the received block B3 behind the block B2 of the blockchain of the blockchain node BC1. The blockchain node BC3 and the blockchain node BC4 perform the similar operation.

Figures 8D, 8E, 8F:
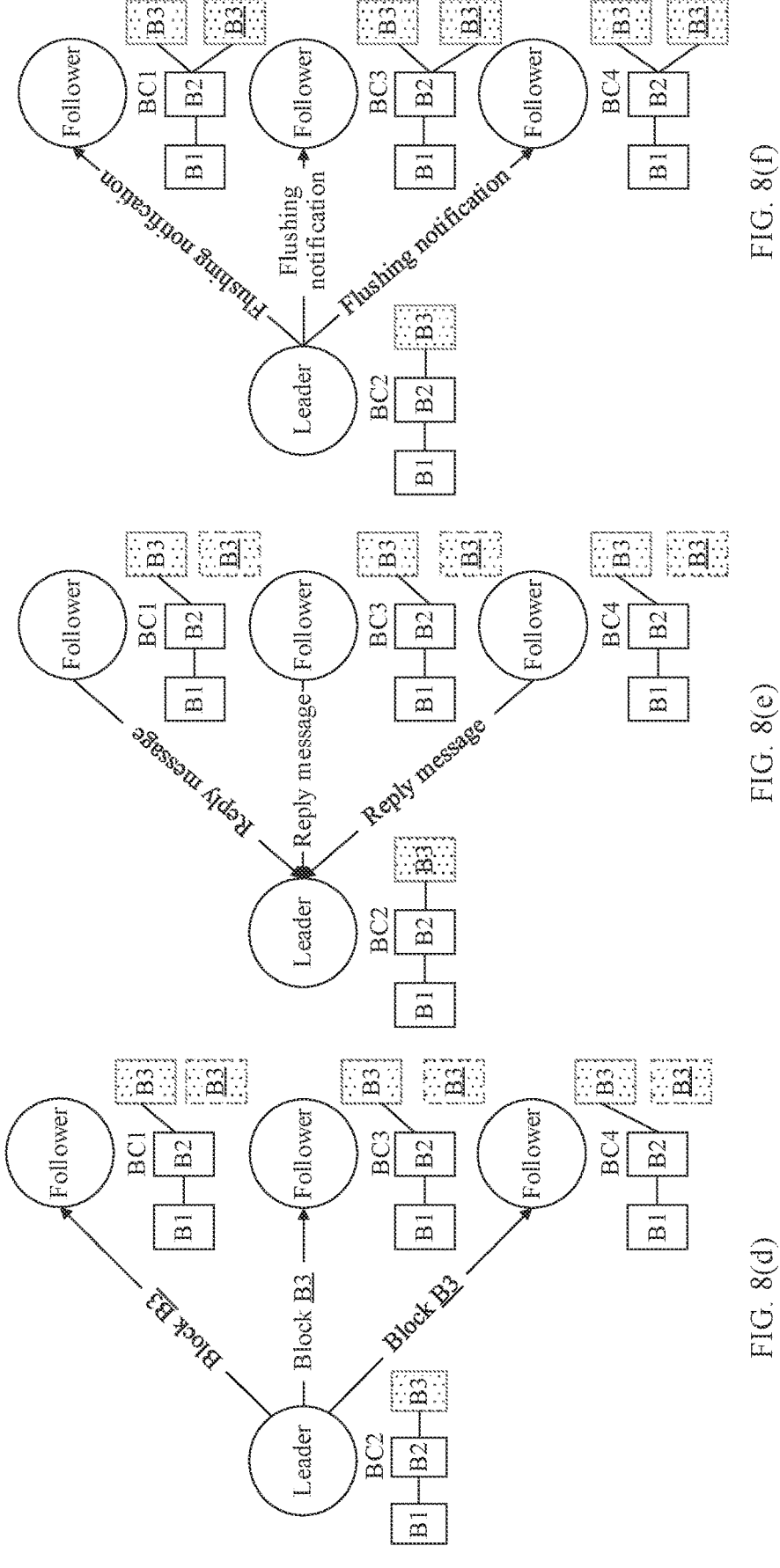

As shown in FIG. 8(d), the blockchain node BC2 packs the collected transactions into the block B3, and inserts the block B3 behind the block B2 of the blockchain of the blockchain node BC2. Then, the blockchain node BC2 sends the block B3 to the blockchain node BC1 (the follower), the blockchain node BC3 (the follower), and the blockchain node BC4 (the follower).

As shown in FIG. 8(e), after receiving the block B3, the blockchain node BC1 sends the reply message to the blockchain node BC2. Similarly, the blockchain node BC3 and the blockchain node BC4 also perform a same operation.

As shown in FIG. 8(f), if the blockchain node BC2 receives the reply messages from the blockchain node BC1, the blockchain node BC3, and the blockchain node BC4, the blockchain node BC2 sends the flushing message to the blockchain node BC1, to indicate the blockchain node BC1 to flush the block B3 to a disk. After the blockchain node BC1 receives the flushing message, the blockchain node BC1 inserts the received block B3 behind the block B2 of the blockchain of the blockchain node BC1. The blockchain node BC3 and the blockchain node BC4 perform the similar operation.

Herein, the blockchain node BC2 generates two different blocks at the same block height (B3), to maliciously cause forking.

3. The blockchain system determines, through a fork processing process, how to perform processing when forking occurs. Specifically, the fork processing process includes the following.

Figures 9A, 9B:
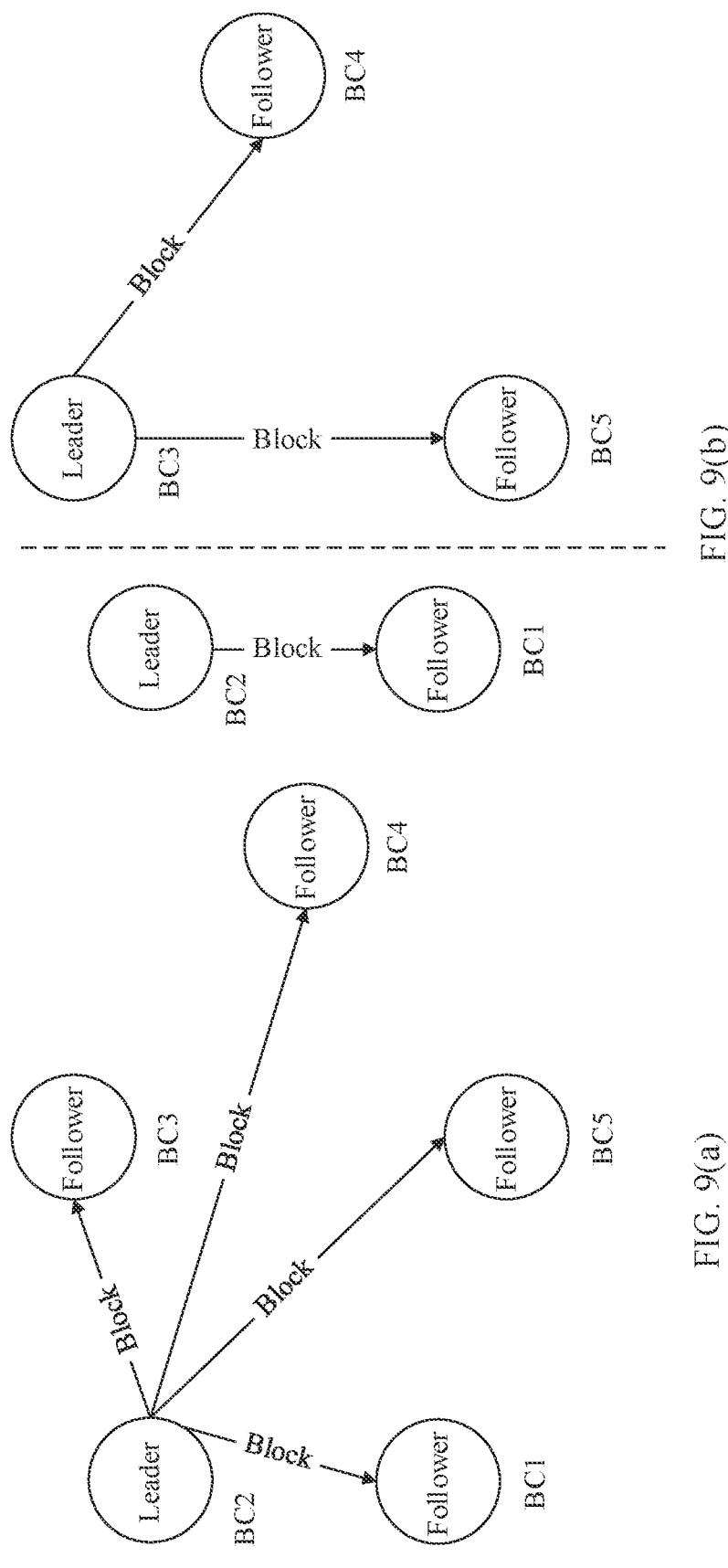
FIG. 9(a) and FIG. 9(b) are a schematic diagram of performing network partitioning on a network in an existing raft consensus mechanism.
Figure 10:
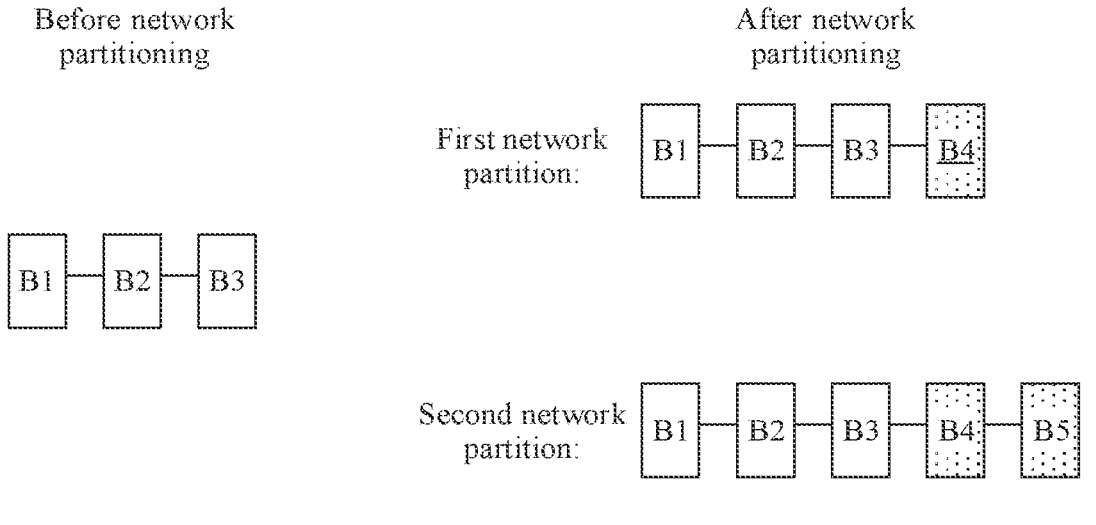
FIG. 10 is a schematic diagram of blockchain forking caused by performing network partitioning on a network in an existing raft consensus mechanism.

As shown in FIG. 9(a), the blockchain system includes a blockchain node BC1, a blockchain node BC2, a blockchain node BC3, a blockchain node BC4, and a blockchain node BC5. The blockchain node BC2 is a leader, and the blockchain node BC1, the blockchain node BC3, and the blockchain node BC4 are followers. The blockchain node BC2 has the block generation qualification, and may separately send a block to the blockchain node BC2, the blockchain node BC3, and the blockchain node BC4. As shown in FIG. 9(b), during network partitioning, the blockchain node BC1 and the blockchain node BC2 are allocated to a first network partition, and the blockchain node BC3, the blockchain node BC4, and the blockchain node BC5 are allocated to a second network partition. In this case, the blockchain node BC2 in the first network partition does not go offline, and still sends the block to the blockchain node BC1. However, the blockchain node BC3 in the second network partition is re-elected as the leader through the leader election process, and sends the block to the blockchain node BC4 and the blockchain node BC5. As shown in FIG. 10, before partitioning, a blockchain stored in blockchain nodes (BC1 and BC2) in an original network partition include a block B1, a block B2, and a block B3. After partitioning, the blockchain node BC2 in the first network partition sends a block B4 to the blockchain node BC1. Therefore, the block B4 is added to the blockchain stored in the blockchain nodes (BC1 and BC2) in the first network partition. The blockchain node BC3 in the second network partition sends the block B4 and the block B5 to the blockchain node BC4 and the blockchain node BC5. Therefore, the block B4 and the block B5 are added to the blockchain stored in the blockchain nodes (BC3, BC4, and BC5) in the second network partition. When the first network partition and the second network partition are reintegrated into one network partition, the blockchain system selects a blockchain with a longer chain length in the second network partition as a main chain, discards a blockchain with a shorter chain length in the first network partition, and places the block B4 back into a transaction pool.

Herein, selecting the relatively long blockchain as the main chain has the following disadvantage: An absolute advantage of the relatively long blockchain violates an equality principle of blockchains because the relatively long blockchain is selected as the main chain and the relatively shorter blockchain is discarded.

It can be learned from the foregoing description that the raft consensus mechanism cannot suppress the byzantine node, and cannot be applied to the lightweight terminal device.

Figure 11:
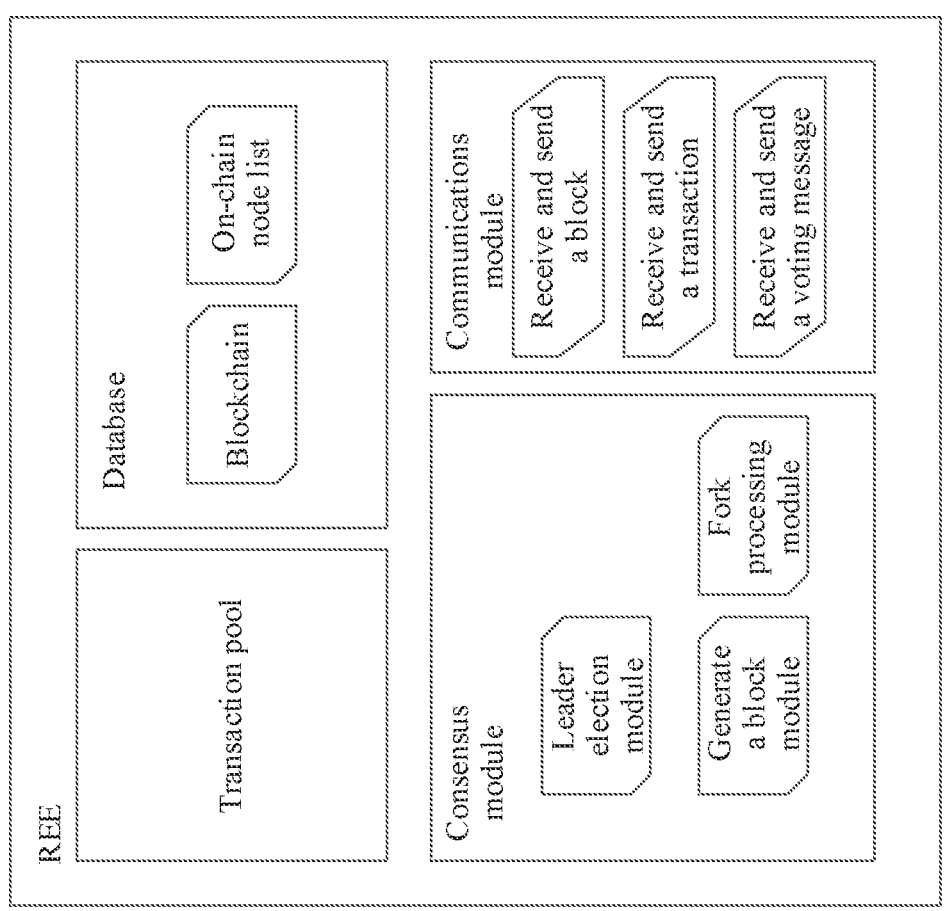
FIG. 11 is a schematic structural diagram of a lightweight terminal device according to this application.
Figure 11:
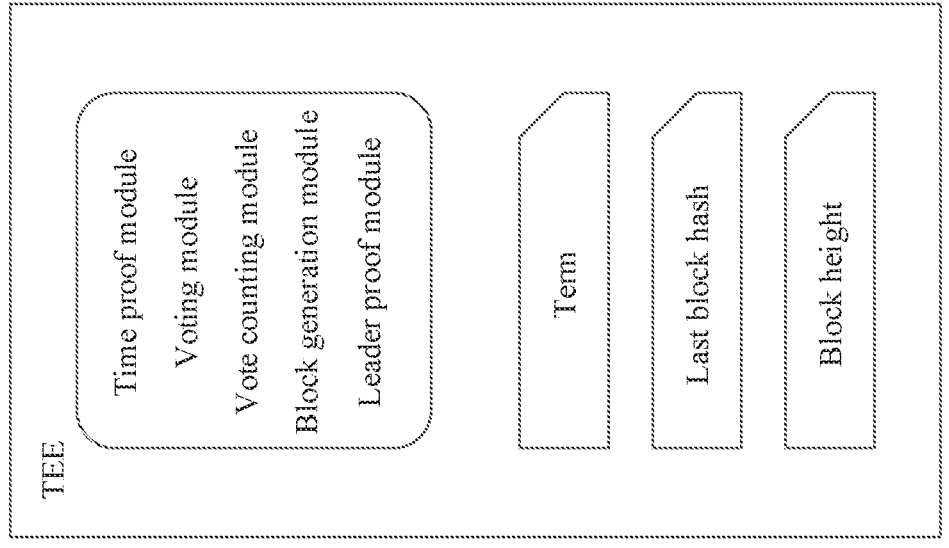

To resolve the foregoing problem, an embodiment of this application provides a terminal device. As shown in FIG. 11, the terminal device includes a trusted execution environment (TEE) and a rich execution environment (REE).

The TEE runs in a trust zone of a main processor of the terminal device. The TEE provides a secure execution environment, for example, a trusted application (TA), TEE data, and also protects confidentiality, integrity, and access permission of the TA and the TEE data. Simply speaking, the TA and the TEE data in the TEE are trusted. In a specific embodiment of this application, the TEE is used to store a time proof (time certificate) module, a voting module, a vote counting module, a block generation module, a leader proof module, a term (round), a block height, and a last block hash. Herein, the TA and the data in the TEE may be preset before delivery, and cannot be changed by the user after delivery.

The REE does not run in the trust zone of the main processor of the terminal device. The REE provides an open, extensible, and universal running environment for an operating system, a client application (CA), REE data, and the like of a mobile terminal. However, confidentiality, integrity, and access permission of the operating system, the CA, and the REE data are not protected. Simply speaking, the operating system, CA, and REE data in the TEE are not trusted. In a specific embodiment of this application, the REE includes a consensus module, a database, a transaction pool, a communications module, and the like. The consensus module includes a leader election module, a block generation module, and a fork processing module. Herein, the operating system, the CA, and the REE data in the REE may be preset before delivery, and may also be changed by the user after delivery. The operating system, CA, and REE data in the REE may also be installed by the user after delivery.

In addition, the TEE and the REE are isolated from each other, and can communicate with each other only by using a specific interface.

Based on the foregoing terminal device, this application further provides a consensus mechanism of a lightweight terminal device, to effectively reduce a computing capability requirement, reduce energy consumption, and improve reliability, so that the consensus mechanism can be applied to the lightweight terminal device.

The consensus mechanism of the lightweight terminal device in this embodiment of this application includes an election process, a block synchronization process, and a fork processing process. The following separately describes the processes in detail.

1. A blockchain system determines, through an election process, which block obtains a block generation qualification. The election process is as follows.

Figures 12A, 12B, 12C:
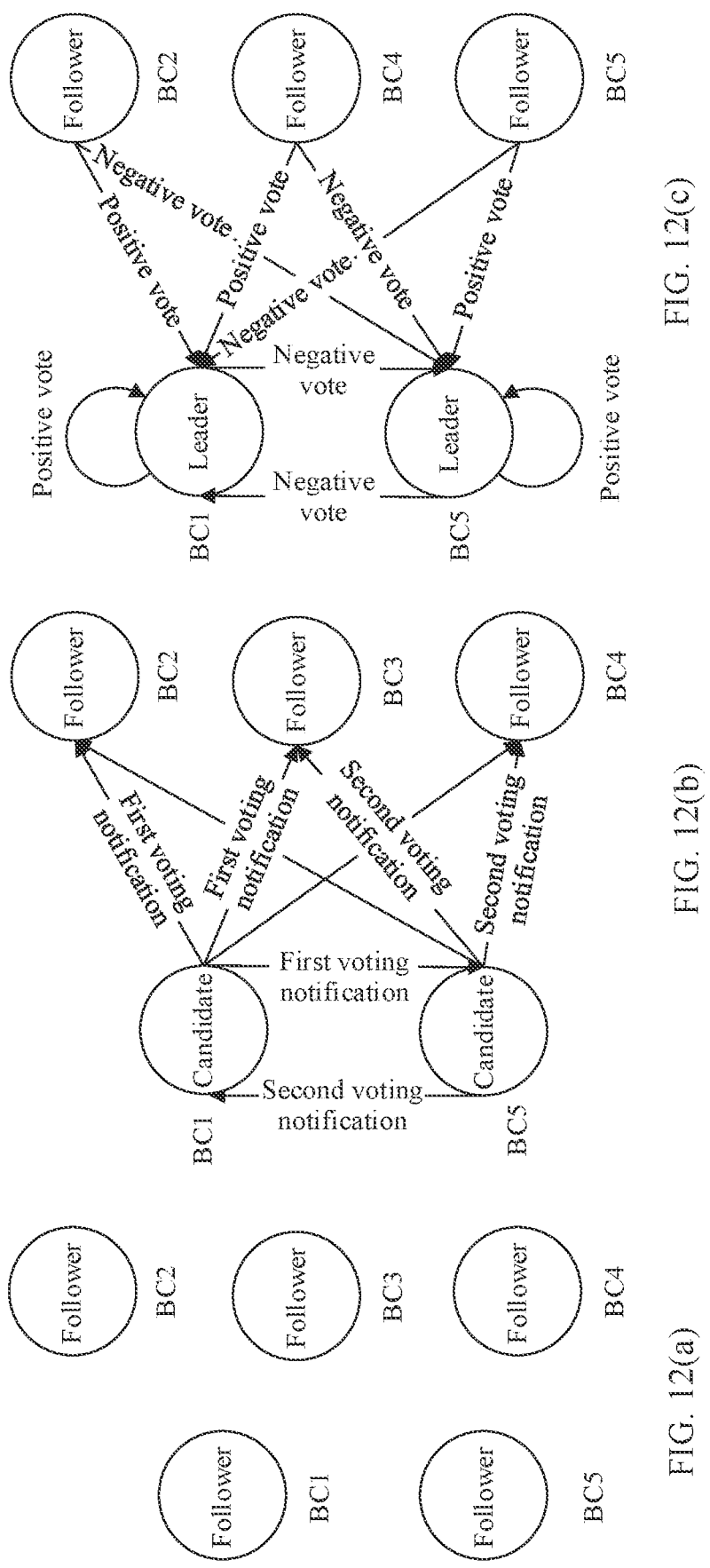
FIG. 12(a), FIG. 12(b), and FIG. 12(c) are a schematic diagram of a process of an election method in a consensus mechanism according to this application.

As shown in FIG. 12(a), initial states of all blockchain nodes in a blockchain system, including a blockchain node BC1, a blockchain node BC2, a blockchain node BC3, a blockchain node BC4, and a blockchain node BC5, are all "follower".

When detecting that there is a transaction in a transaction pool in an REE of the blockchain node BC1, the leader election module in the REE of the blockchain node BC1 sends a random waiting time obtaining notification to a time proof module in a TEE of the blockchain node BC1. The random waiting time obtaining notification includes a last block hash in a blockchain and one transaction in the transaction pool. After receiving the random waiting time obtaining notification, the time proof module in the TEE of the blockchain node BC1 verifies that the random waiting time obtaining notification actually includes one transaction in the transaction pool, and obtains the last block hash in the TEE. If the received last block hash is consistent with a last block hash in the TEE of the blockchain node BC1, the time proof module refuses to generate a random waiting time period. If the finally received last block hash is consistent with the last block hash in the TEE of the blockchain node BC1, the time proof module generates the random waiting time period, and sends the random waiting time period to the leader election module in the REE of the blockchain node BC1. In this case, the leader election module in the REE of the blockchain node BC1 and the time proof module in the TEE of the blockchain node BC1 start a timer to perform timing based on the random waiting time period. After the timer times out, the leader election module in the REE of the blockchain node BC1 sends the time proof obtaining notification to the time proof module in the TEE of the blockchain node BC1. After receiving the time proof obtaining notification, the time proofing module in the TEE of the blockchain node BC1 signs the random waiting time period by using a signature generation function in the TEE, and sends a signed random waiting time period to the leader election module in the REE of the blockchain node BC1. The blockchain node BC2, the blockchain node BC3, and the blockchain node BC4 perform the same operation. It is assumed that a random waiting time period of the blockchain node BC1 is 1 second, a random waiting time period of the blockchain node BC2 is 3 seconds, a random waiting time period of the blockchain node BC3 is 2 seconds, a random waiting time period of the blockchain node BC4 is 2 seconds, and a random waiting time period of the blockchain node BC5 is 1 second.

Herein, the random waiting time period of the blockchain node BC1 is generated in the TEE, the timer in the TEE counts the random waiting time period, and the random waiting time period is signed in the TEE, to ensure that the random waiting time period cannot be forged, and to prevent a byzantine node from forging the random waiting time period to be elected as a leader.

In addition, the last block hash is stored in the TEE, to prevent the last block hash from being forged by the byzantine node. In this way, the random waiting time period is continuously requested until a relatively short random waiting time period is obtained, so that the blockchain node BC1 can be elected as the leader.

As shown in FIG. 12(b), the blockchain node BC1 and the blockchain node BC5 are the first batch of blockchain nodes on which the waiting time period times out.

If the leader election module in the REE of the blockchain node BC1 does not receive a block from the leader node in the current term within the entire random waiting time period, it indicates that there is no leader node, and the leader election module in the REE of the blockchain node BC1 changes a state of the blockchain node BC1 from a follower to a candidate. The leader election module in the REE of the blockchain node BC1 sends a notification to the TEE time proof module of the blockchain node BC1. The time proof module of the TEE of the blockchain node BC1 adds 1 to the term stored in the TEE, and votes for itself. Then, the blockchain node BC1 sends a first voting notification to the blockchain node BC2, the blockchain node BC3, the blockchain node BC4, and the blockchain node BC5. The first voting notification includes a term of the blockchain node BC1 and the signed random waiting time period. Similarly, the blockchain node BC5 sends a second voting notification to the blockchain node BC1, the blockchain node BC2, the blockchain node BC3, and the blockchain node BC4, and votes for itself.

Herein, the blockchain node BC1 determines whether to change the state from the follower to the candidate by determining whether the block sent by the leader node is received within the term, instead of determining whether to change the state from the follower to the candidate by determining whether a heartbeat signal sent by the leader node is received within the term. In this way, the blockchain node in the blockchain system does not need to send the heartbeat signal. This effectively reduces power consumption of the blockchain node.

In addition, the term is stored in the TEE, and the term is also changed in the TEE. Therefore, the byzantine node can be prevented from changing the term and votes for a plurality of times to select a plurality of leaders.

As shown in FIG. 12(c), the blockchain node BC2 first receives the first voting notification, and then receives a second voting notification. After the blockchain node BC2 receives the first voting notification, the leader election module in the REE of the blockchain node BC2 verifies the signed random waiting time period carried in the first voting notification. If the verification fails, the first voting notification is discarded. If the verification succeeds, the first voting notification is sent to a voting module in the TEE of the blockchain node BC2. After receiving the first voting notification, the voting module in the TEE of the blockchain node BC2 verifies the first voting notification again. If the verification fails, the first voting notification is discarded. If the verification succeeds, the voting module in the TEE of the blockchain node BC2 compares a term of the blockchain node BC2 with the term of the blockchain node BC1. Because the term of the blockchain node BC1 is greater than the term of the blockchain node BC2, and the blockchain node BC2 has not cast a positive vote in the current term, the voting module in the TEE of the blockchain node BC2 generates the positive vote, and encrypts the positive vote. The voting module in the TEE of the blockchain node BC2 sends an encrypted positive vote to the leader election module in the REE of the blockchain node BC2. The leader election module in the REE of the blockchain node BC2 sends the encrypted positive vote to the leader election module in the REE of the blockchain node BC1.

After the blockchain node BC2 receives the second voting notification, the leader election module in the REE of the blockchain node BC2 verifies the signed random waiting time period carried in the second voting notification. If the verification fails, the second voting notification is discarded. If the verification succeeds, the second voting notification is sent to the voting module in the TEE of the blockchain node BC2. After receiving the second voting notification, the voting module in the TEE of the blockchain node BC2 verifies the second voting notification again. If the verification fails, the second voting notification is discarded. If the verification succeeds, the voting module in the TEE of the blockchain node BC2 compares the term of the blockchain node BC2 with the term of the blockchain node BC1. Although the term of the blockchain node BC1 is greater than the term of the blockchain node BC2, the blockchain node BC2 has cast a positive vote in the current term. Therefore, the voting module in the TEE of the blockchain node BC2 generates a negative vote, and encrypts the negative vote. The voting module in the TEE of the blockchain node BC2 sends a negative positive vote to the leader election module in the REE of the blockchain node BC2. The leader election module in the REE of the blockchain node BC2 sends the encrypted negative vote to a leader election module in an REE of the blockchain node BC5.

Similarly, the blockchain node BC3 first receives the first voting notification sent by the blockchain node BC1, and then receives the second voting notification sent by the blockchain node BC5. Therefore, the blockchain node BC3 votes for the blockchain node BC1, and the blockchain node BC3 votes against the blockchain node BC5. The blockchain node BC4 first receives the second voting notification sent by the blockchain node BC5, and then receives the first voting notification sent by the blockchain node BC1. Therefore, the blockchain node BC4 votes against the blockchain node BC1, and the blockchain node BC3 votes for the blockchain node BC5.

Herein, the blockchain node needs to verify the signed random waiting time period in the voting notification, to prevent the byzantine node from forging the voting notification to be elected as the leader. The blockchain node first verifies the signed random waiting time period by using the leader election module of the REE, discards the voting notification that fails to be verified, and sends the voting notification that succeeds in the verification to the voting module in the TEE. This can effectively reduce a workload of the voting module in the TEE. However, the voting module in the TEE verifies the signed random waiting time period again, to effectively prevent the leader election module in the blockchain node from forging the signed random waiting time period. This improves reliability.

The leader election module in the REE of the blockchain node BC1 receives the encrypted positive vote sent by the blockchain node BC2. The leader election module in the REE of the blockchain node BC1 sends the encrypted positive vote to the vote counting module in the TEE of the blockchain node BC1. The vote counting module in the TEE of the blockchain node BC1 decrypts the encrypted positive vote, to obtain a decrypted positive vote. Similarly, the vote counting module in the TEE of the blockchain node BC1 obtains the positive votes from the blockchain node BC2 and the blockchain node BC3, and the negative vote from the blockchain node BC4.

The vote counting module in the TEE of the blockchain node BC1 collects statistics on the received votes. The vote counting module in the TEE of the blockchain node BC1 collects statistics on the received positive votes, and the received positive votes is more than half of the received votes (the positive votes and the negative votes). Therefore, the vote counting module in the TEE of the blockchain node BC1 indicates the leader election module in the REE of the blockchain node BC1 to change the state from the "candidate" to the "leader". In addition, the vote counting module in the TEE of the blockchain node BC1 generates a leader proof, and signs the leader proof. The leader proof includes a quantity of received votes, a quantity of positive votes, a voting state, and a leader identifier. The voting state may be a voting state of each voting node. For example, the blockchain node BC2 casts a positive vote, the blockchain node BC3 casts a positive vote, and the blockchain node BC4 casts a negative vote.

Similarly, the vote counting module in the TEE of the blockchain node BC5 collects statistics on the received positive votes, and the received positive votes is less than half of the received votes (the positive votes and the negative votes). Therefore, the vote counting module in the TEE of the blockchain node BC1 indicates the leader election module in the REE of the blockchain node BC1 to change the state from the "candidate" to the "follower".

Herein, the votes (including the positive votes and the negative votes) are encrypted in the TEE of the blockchain node, and the votes are decrypted in the TEE of the blockchain node. Therefore, the votes are always in a confidential state in a transmission process, and the leader election module of the blockchain node can be prevented from obtaining voting content and selectively discarding the negative votes, in other words, the leader election module of the blockchain node can be prevented from forging the votes to be elected as the leader and to forge an election result.

The entire vote counting process takes place in the TEE. This avoids the election of the leader by forging the quantity of votes.

In addition, the state of the blockchain node is changed from the "candidate" to the "leader" when the positive votes received by the blockchain node are more than half of the received votes (the positive votes and the negative votes), instead of changing the state of the blockchain node from the "candidate" to the "leader" when the received positive votes are more than half of received votes of all nodes. This can effectively improve availability.

Figure 13:
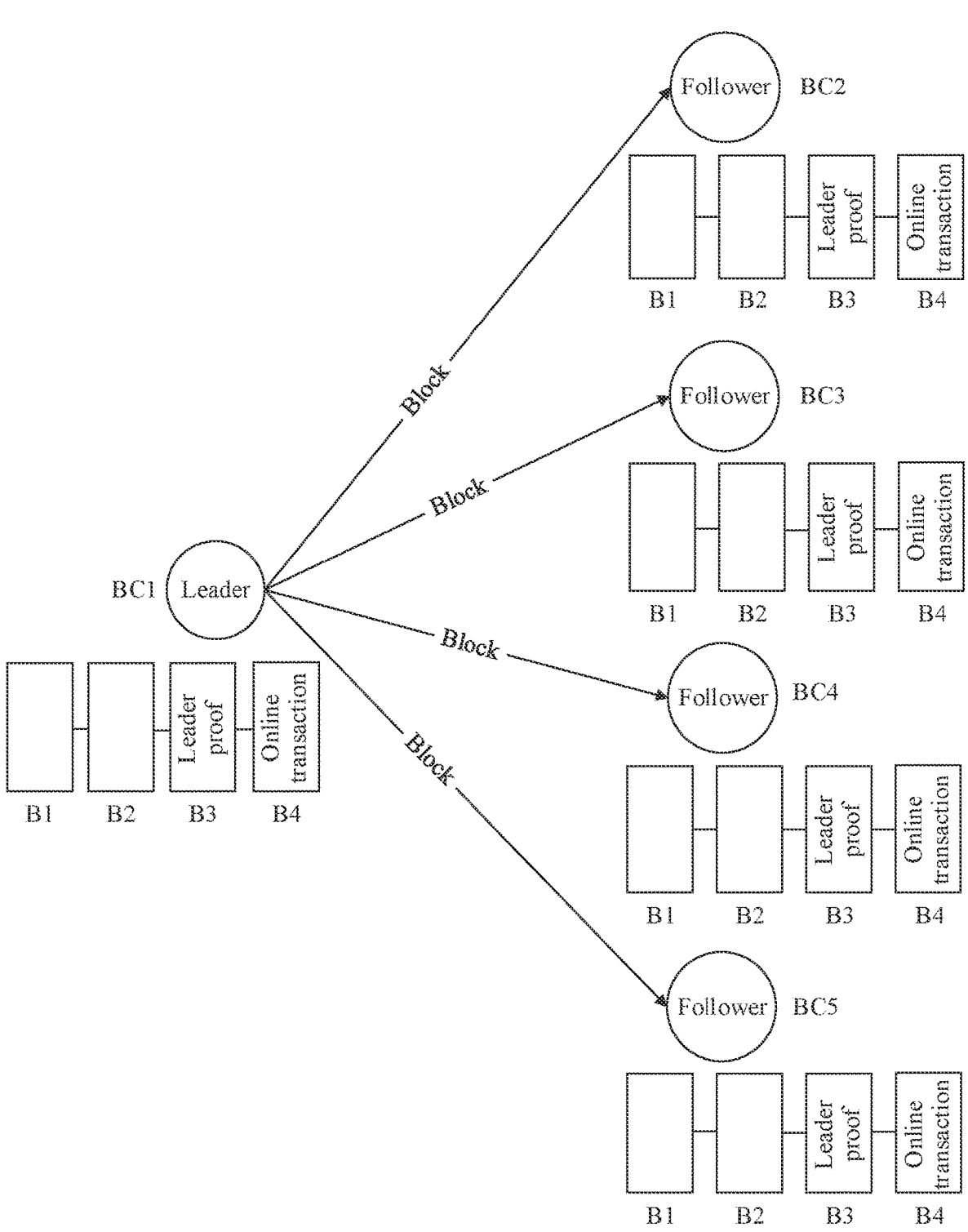
FIG. 13 is a schematic diagram of a process of a block synchronization process in a consensus mechanism according to this application.

2. The blockchain system determines, through the block synchronization process, how to flush a generated block to a disk. The example corresponding to FIG. 12(a), FIG. 12(b), and FIG. 12(c) is still used as an example. After the blockchain node BC1 has the block generation qualification, as shown in FIG. 13, the block synchronization process is as follows.

When a vote counting timer times out, a block generation module in an REE of a blockchain node BC1 obtains a signed leader proof from a vote counting module in a TEE of the blockchain node BC1. An original blockchain of the blockchain node BC1 has a block B1 and a block B2. The block generation module in the REE of the blockchain node BC1 packs a collected transaction, a last block hash, a leader node identifier, and the signed leader proof into a block B3, signs the block B3 by using a signature generation function, to obtain a signed block B3, updates the last block hash, and inserts the signed block B3 behind the block B2 in the blockchain of the blockchain node BC1. Then, the block generation module in the REE of the blockchain node BC1 sends the signed block B3 to a blockchain node BC2 (a follower), a blockchain node BC3 (a follower), a blockchain node BC4 (a follower), and a blockchain node BC5 (a follower).

After receiving the signed block B3, a block generation module in the REE of the blockchain node BC2 obtains the signed leader proof from the signed block B3 for verification. If the verification fails, the block generation module refuses to flush the block B3 to the disk. If the verification succeeds, the block generation module sends the signed leader proof to a leader proof module in a TEE of the blockchain node BC2. The leader proof module in the TEE of the blockchain node BC2 verifies the signed leader proof again. If the verification fails, the leader proof module notifies the block generation module in the REE of the blockchain node BC2 to refuse to flush the signed block B3 to the disk. If the verification succeeds, the leader proof module determines whether there is a fork. If there is the fork, the leader proof module triggers the fork processing process (as described in the following). If there is no fork, the leader proof module increases a term in the TEE by 1, notifies the block generation module in the REE of the blockchain node BC2 to flush the signed block B3 to the disk, and updates the last block hash. In addition, when successfully verifying the leader proof, the leader proof module in the TEE of the blockchain node BC2 determines that a leader identifier changes, updates the leader identifier in the TEE, and updates, based on a voting state in the leader proof, a time stamp of a blockchain node that votes for the leader and that is in an on-chain node list in a database. Similarly, the blockchain node BC3 performs the same operation.

After receiving the signed block B3, a block generation module in the REE of the blockchain node BC4 obtains the signed leader proof from the signed block B3 for verification. If the verification fails, the block generation module refuses to flush the signed block B3 to the disk. If the verification succeeds, the block generation module sends the signed leader proof to a leader proof module in a TEE of the blockchain node BC4. The leader proof module in the TEE of the blockchain node BC4 verifies the signed leader proof again. If the verification fails, the leader proof module notifies the block generation module in the REE of the blockchain node BC4 to refuse to flush the signed block B3 to the disk. If the verification succeeds, the leader proof module determines whether there is a fork. If there is the fork, the leader proof module triggers the fork processing process (as described in the following). If there is no fork, the leader proof module increases a term in the TEE by 1, notifies the block generation module in the REE of the blockchain node BC4 to flush the signed block B3 to the disk. In addition, when successfully verifying the leader proof, the leader proof module in the TEE of the blockchain node BC4 determines that a leader identifier changes, updates the leader identifier in the TEE, and updates, based on a voting state in the leader proof, a time stamp of a blockchain node that votes for the leader and that is in an on-chain node list in a database. In addition, the blockchain node BC4 votes against the blockchain node BC1 in the election process. Therefore, the blockchain node BC4 sends an online transaction to the blockchain node BC1. The online transaction is used to indicate that the blockchain node BC4 becomes the follower of the blockchain node BC1. Similarly, the blockchain node BC5 performs the same operation.

The block generation module in the REE of the blockchain node BC1 packs a plurality of transactions including the online transaction into a block B4, and signs the block B4 by using the signature generation function, to obtain a signed block B4, and inserts the block B4 behind the block B3 of the blockchain of the blockchain node BC1. The block generation module in the REE of the blockchain node BC1 notifies a block generation module in the REE of the blockchain node BC1 to update the last block hash. Then, the block generation module in the REE of the blockchain node BC1 sends the block B4 to the blockchain node BC2, the blockchain node BC3, the blockchain node BC4, and the blockchain node BC5.

After receiving the block B4, the block generation module of the blockchain node BC2 verifies the signed block B4. If the verification fails, the block generation module refuses to flush the signed block B4 to the disk. If the verification succeeds, the block generation module flushes the signed block B4 to the disk. Similarly, the blockchain node BC3, the blockchain node BC4, and the blockchain node BC5 all verify the signed block B4, and flushes the signed block B4 to the disk if the verification succeeds.

3. The blockchain system determines, through a fork processing process, how to perform processing when forking occurs.

Figures 14A, 14B:
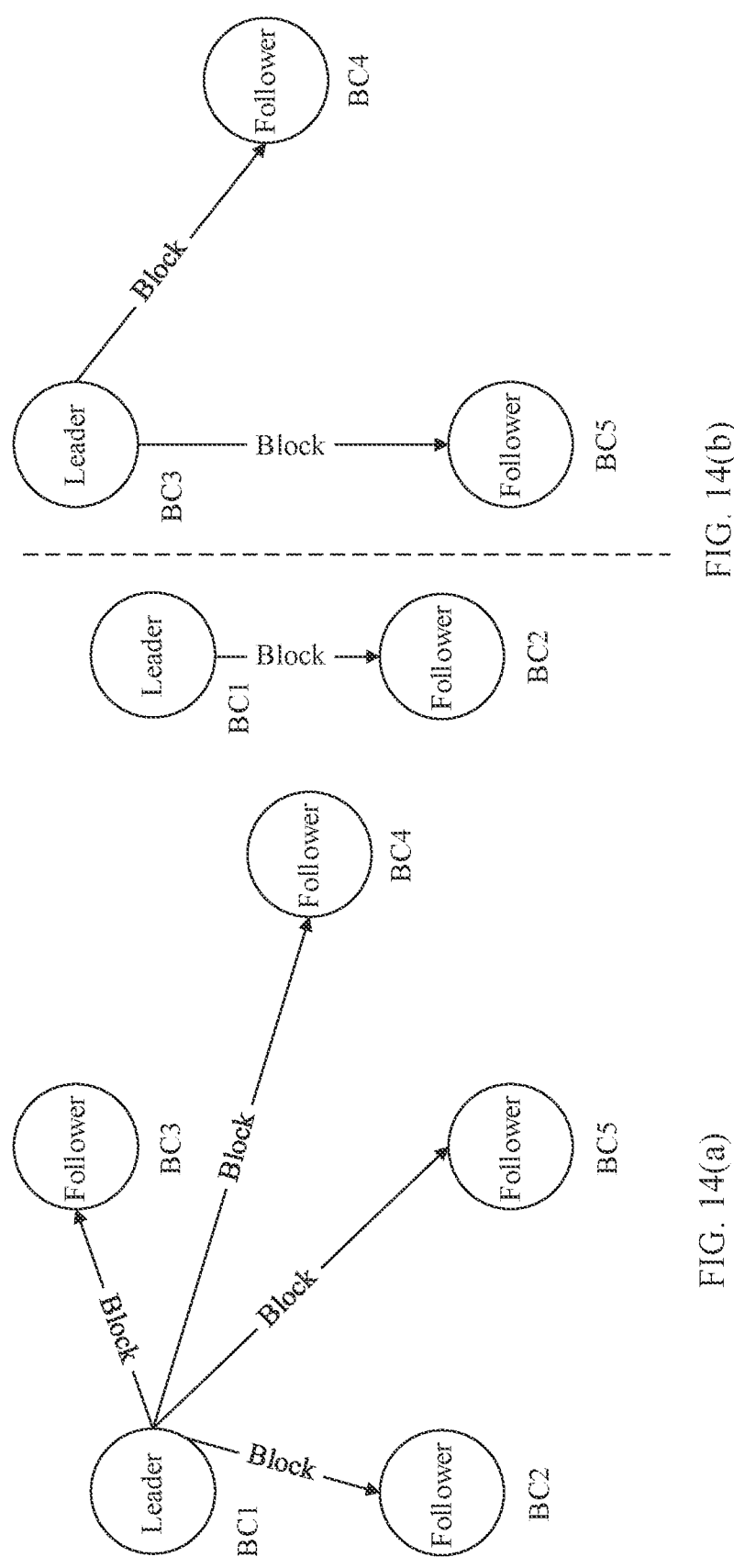
FIG. 14(a) and FIG. 14(b) are a schematic diagram of a network partition in a consensus mechanism according to this application.

The blockchain system may determine that there is the fork in the following manner. An example corresponding to FIG. 13 is still used for description. As shown in FIG. 14(*a*) and FIG. 14(*b*), after the signed block B4 is flushed to the disk, the blockchain system performs network partitioning. The blockchain node BC1 and the blockchain node BC2 are allocated to a first network partition, and the blockchain node BC3, the blockchain node BC4, and the blockchain node BC5 are allocated to a second network partition. In this case, the blockchain node BC1 in the first network partition does not go offline, and still sends a block to the blockchain node BC2. However, the blockchain node BC3 in the second network partition is re-elected as the leader according to the foregoing leader election process, and sends the block to the blockchain node BC4 and the blockchain node BC5 according to the foregoing block synchronization process. Here, it is assumed that when the blockchain node BC3 is elected as the leader, the blockchain node BC4 and the blockchain node BC5 vote for each other.

Figure 15:
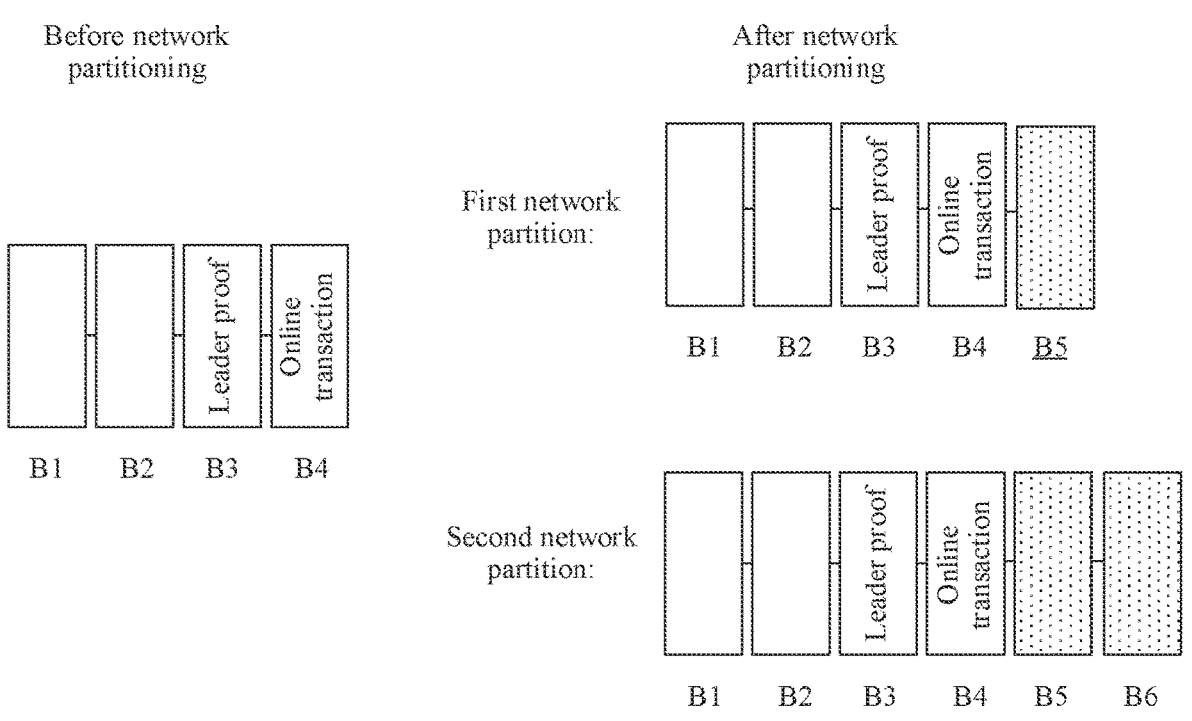
FIG. 15 is a schematic diagram of blockchain forking caused by performing network partitioning on a network in a consensus mechanism according to this application.

As shown in FIG. 15, before partitioning, a blockchain stored in blockchain nodes (BC1 and BC2) in an original network partition include a block B1, a block B2, a block B3 and a block B4. After partitioning, the blockchain node BC1 in the first network partition sends a block B5 to the blockchain node BC2. Therefore, the block B5 is added to the blockchain stored in the blockchain nodes (BC1 and BC2) in the first network partition. The blockchain node BC3 in the second network partition sends the block B5 and the block B6 to the blockchain node BC4 and the blockchain node BC5. Therefore, the block B5 and the block B6 are added to the blockchain stored in the blockchain nodes (BC3, BC4, and BC5) in the second network partition. Herein, it is assumed that the block B5 includes the leader proof sent by the blockchain node BC3.

Figure 16:
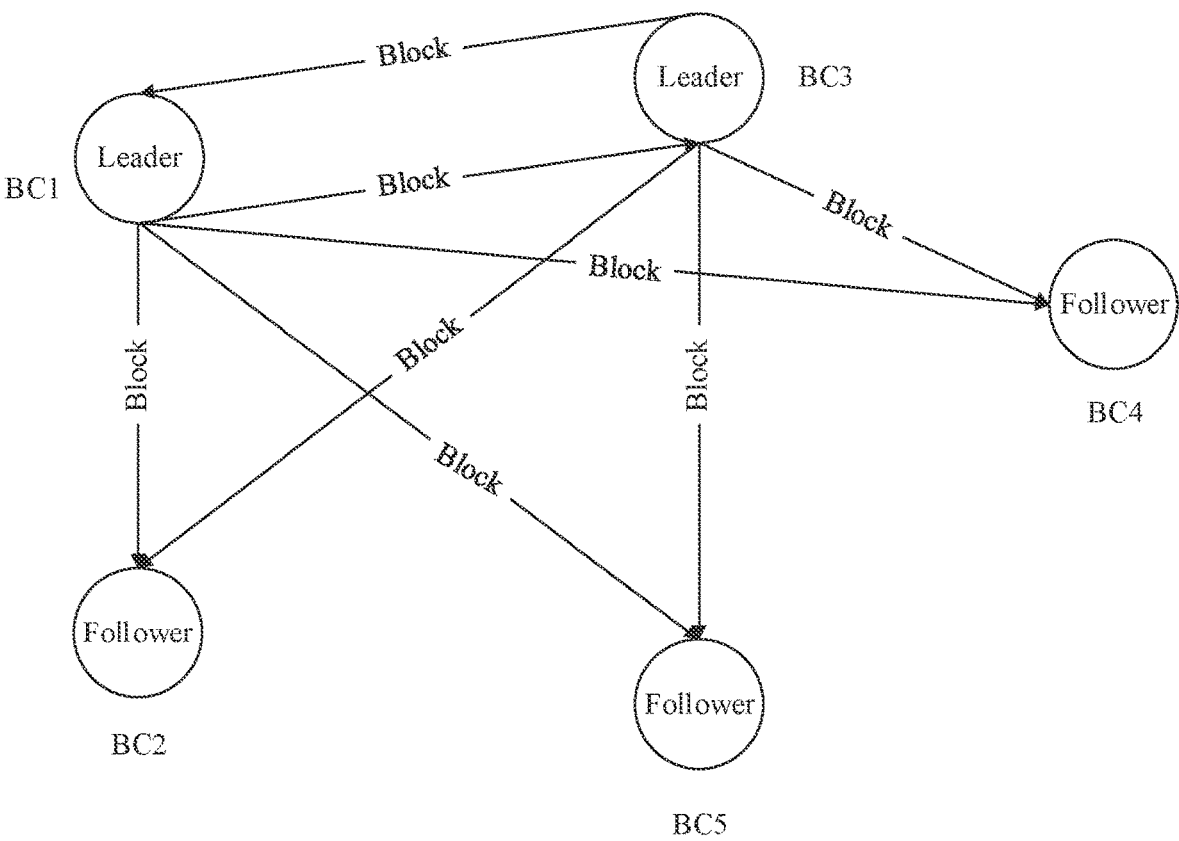
FIG. 16 is a schematic diagram of blocks generation after a network is re-converged in a consensus mechanism according to this application.

After the first network partition and the second network partition are re-converged, as shown in FIG. 16, a blockchain node BC1 may send a block to a blockchain node BC2, a blockchain node BC3, a blockchain node BC4, and a blockchain node BC5. The blockchain node BC3 may send a block to the blockchain node BC1, the blockchain node BC2, the blockchain node BC4, and the blockchain node BC5. For ease of description, the following describes the entire fork processing process by using an example in which the blockchain node BC1 separately sends the block to the blockchain node BC2, the blockchain node BC3, the blockchain node BC4, and the blockchain node BC5, and an example in which the blockchain node BC3 separately sends the block to the blockchain node BC1, the blockchain node BC2, the blockchain node BC4, and the blockchain node BC5.

The block generation module in the REE of the blockchain node BC1 packs a collected transaction into a block B6, and inserts the block B6 behind the block B5 of the blockchain of the blockchain node BC1. The block generation module in the REE of the blockchain node BC1 separately sends the block B6 to the blockchain node BC2, the blockchain node BC3, the blockchain node BC4, and the blockchain node BC5.

After the blockchain node BC2 receives the block B6 sent by the blockchain node BC1, a fork processing module of the blockchain node BC2 determines whether one of the following cases is met: (a) A block height of the block B6 is equal to a value obtained by adding 1 to a block height of the last block in a blockchain of the blockchain node BC2, and a parent node hash value of the block B6 is not equal to a hash value of the last block in the blockchain of the blockchain node BC2. (b) The block height of the block B6 is less than the value obtained by adding 1 to the block height of the last block in the blockchain of the blockchain node BC2, and a hash value of the block B6 is different from a hash value of a block B6 in the blockchain of the blockchain node BC2. (c) The block height of the block B6 is greater than the value obtained by adding 1 to the block height of the last block in the blockchain of the blockchain node BC2. When any one of the foregoing cases is not met, the blockchain node BC2 determines that there is no fork. Herein, the fork processing module in the blockchain node BC2 determines that any case is not met, and the blockchain node BC2 determines that there is no fork. If there is no fork, the blockchain node BC2 performs flushing according to the foregoing block synchronization process.

After the blockchain node BC3 receives the block B6 sent by the blockchain node BC1, a fork processing module of the blockchain node BC3 determines whether one of the following cases is met: (a) A block height of the block B6 is equal to a value obtained by adding 1 to a block height of the last block in a blockchain of the blockchain node BC3, and a parent node hash value of the block B6 is not equal to a hash value of the last block in the blockchain of the blockchain node BC3. (b) The block height of the block B6 is less than the value obtained by adding 1 to the block height of the last block in the blockchain of the blockchain node BC3, and a hash value of the block B6 is different from a hash value of a block B6 in the blockchain of the blockchain node BC3. (c) The block height of the block B6 is greater than the value obtained by adding 1 to the block height of the last block in the blockchain of the blockchain node BC3. When any one of the foregoing cases is met, the blockchain node BC3 determines that there is the fork. Herein, the fork processing module in the blockchain node BC3 determines the case (b) is met, and the blockchain node BC3 determines that there is the fork.

The fork processing module of the blockchain node BC3 sends hash values of the last n (for example, the last four) blocks in the blockchain to a fork processing module of the blockchain node BC1.

The blockchain node BC1 compares the hash values of the last n blocks in the blockchain of the blockchain node BC3 with hash values of blocks in the blockchain of the blockchain node BC1, to find a fork point. For example, the fork processing module of the blockchain node BC3 sends hash values of the block B2, the block B3, the block B4, and the block B5 in the blockchain to the fork processing module of the blockchain node BC1. The blockchain node BC1 compares the hash values of the block B2, the block B3, the block B4, and the block B5 with hash values of the block B2, the block B3, the block B4, and the block B5 of the blockchain node BC1, and determines that the blocks B1 are the same, the blocks B2 are the same, the blocks B3 are the same, and the blocks B4 are the same, in other words, the fork starts from the blocks B5.

The fork processing module of the blockchain node BC1 sends all fork blocks to the fork processing module of the blockchain node BC3. Herein, the fork processing module of the blockchain node BC1 sends the block B5 and the block B6 to the fork processing module of the blockchain node BC3.

The fork processing module of the blockchain node BC3 separately determines quantities of participants of the two branch chains behind the fork point, retains a branch chain with a relatively large quantity of participants, and discards a branch chain with a relatively small quantity of participants. The participants include a node that has voted for a leader of the branch chain, and a blockchain node that does not vote for the leader of the branch chain during election but initiates an online transaction for the leader.

The blockchain node BC3 determines a quantity of participants of the branch chain formed by the block B5 and the block B6, and determines a quantity of participants of the branch chain formed by the block B5 and the block B6.

For the first branch chain formed by the block B5 and the block B6, the fork processing module of the blockchain node BC3 may find, by traversing the blocks, a leader proof of the blockchain node BC1 in the block B3, and online transactions of the blockchain node BC4 and the blockchain node BC5 in the block B4. Therefore, the fork processing module of the blockchain node BC3 may collect statistics on the quantity of participants of the first branch chain, and the participants include: the blockchain node BC1, the blockchain node BC2, and the blockchain node BC3 that vote for the blockchain node BC1, and the blockchain node BC4 and the blockchain node BC5 that vote against the blockchain node BC1 but send the online transaction.

For the second branch chain formed by the block B5 and the block B6, the fork processing module of the blockchain node BC3 may find a leader proof of the blockchain node BC3 in the block B5 by traversing the blocks. Therefore, the fork processing module of the blockchain node BC3 may collect statistics on the quantity of participants of the second branch chain, and the participants include: the blockchain node BC3, the blockchain node BC4, and the blockchain node BC5 that vote for the blockchain node BC3.

It may be learned through comparison that the blockchain node BC3, the blockchain node BC4, and the blockchain node BC5 are all participants in the two chains. However, the blockchain node BC3, the blockchain node BC4, and the blockchain node BC5 participate in the first chain relatively early, and participate in the second branch chain relatively late. Therefore, the blockchain node BC3, the blockchain node BC4, and the blockchain node BC5 are deleted from the participants of the first branch chain.

The participants of the first branch chain include the blockchain node BC1 and the blockchain node BC2.

The participants of the second branch chain include the blockchain node BC3, the blockchain node BC4, and the blockchain node BC5.

The fork processing module of the blockchain node BC3 keeps a leader state unchanged, discards the first branch chain, and places the transactions in the block B5 and the block B6 back into a transaction pool. Therefore, the blockchain in the blockchain node BC3 includes the block B1, the block B2, the block B3, the block B4, the block B5, and the block B6.

Similarly, the blockchain node BC4 and the blockchain node BC5 also perform the same operation, to discard the first branch chain and retain the second branch chain.

It may be understood that the foregoing example uses an example in which the quantity of participants of the first branch chain is different from that of the second branch chain. However, when the quantity of participants of the first branch chain is the same as that of the second branch chain, because the blockchain node BC3 becomes the leader relatively late, the fork processing module of the blockchain node BC3 may select the blockchain node BC3 as the leader, and does not accept the blockchain node BC1 as the leader.

A block generation module in the REE of the blockchain node BC3 packs a collected transaction into a block B7, and inserts the block B7 behind the block B6 of the blockchain of the blockchain node BC3. The block generation module in the REE of the blockchain node BC3 separately sends the block B7 to the blockchain node BC1, the blockchain node BC2, the blockchain node BC4, and the blockchain node BC5.

After the blockchain node BC1 receives the block B7 sent by the blockchain node BC3, the fork processing module in the blockchain node BC1 determines whether one of the following cases is met: (a) A block height of the block B7 is equal to a value obtained by adding 1 to a block height of the last block in a blockchain of the blockchain node BC1, and a parent node hash value of the block B7 is not equal to a hash value of the last block in the blockchain of the blockchain node BC1. (b) The block height of the block B7 is less than the value obtained by adding 1 to the block height of the last block in the blockchain of the blockchain node BC1, and a hash value of the block B7 is different from a hash value of a block B7 in the blockchain of the blockchain node BC1. (c) The block height of the block B7 is greater than the value obtained by adding 1 to the block height of the last block in the blockchain of the blockchain node BC1. When any one of the foregoing cases is met, the blockchain node BC1 determines that there is the fork. Herein, the fork processing module in the blockchain node BC1 determines the case (a) is met, and the blockchain node BC1 determines that there is the fork.

The fork processing module of the blockchain node BC1 sends hash values of the last n (for example, the last four) blocks in the blockchain to the fork processing module of the blockchain node BC3. The blockchain node BC3 compares the hash values of the last n blocks in the blockchain of the blockchain node BC1 with hash values of blocks in the blockchain of the blockchain node BC1, to find a fork point. For example, the fork processing module of the blockchain node BC1 sends hash values of the block B3, the block B4, the block B5, and the block B6 in the blockchain to the fork processing module of the blockchain node BC3. The blockchain node BC3 compares the hash values of the block B3, the block B4, the block B5, and the block B6 with hash values of the block B3, the block B4, the block B5, and the block B6 of the blockchain node BC3, and determines that the blocks B1 are the same, the blocks B2 are the same, the blocks B3 are the same, and the blocks B4 are the same, in other words, the fork starts from the blocks B5.

The fork processing module of the blockchain node BC3 sends all fork blocks to the fork processing module of the blockchain node BC1. Herein, the fork processing module of the blockchain node BC3 sends the block B5, the block B6, and the block B7 to the fork processing module of the blockchain node BC1. After receiving the block B5, the block B6, and the block B7 that are sent by the blockchain node BC3, the fork processing module of the blockchain node BC1 separately determines quantities of participants of the two chains behind the fork point, retains a branch chain with a relatively large quantity of participants, and discards a branch chain with a relatively small quantity of participants. The participants include a node that has voted for a leader of the branch chain, and a blockchain node that does not vote for the leader of the branch chain during election but initiates an online transaction for the leader.

The blockchain node BC1 determines a quantity of participants of the third branch chain formed by the block B5 and the block B6, and determines a quantity of participants of the fourth branch chain formed by the block B5, the block B6, and the block B7.

For the third branch chain formed by the block B5 and the block B6, the fork processing module of the blockchain node BC1 may find, by traversing the blocks, a leader proof of the blockchain node BC1 in the block B3, and online transactions of the blockchain node BC4 and the blockchain node BC5 in the block B4. Therefore, the fork processing module of the blockchain node BC1 may collect statistics on the quantity of participants of the third, branch chain formed by the block B5 and the block B6, and the participants include: the blockchain node BC1, the blockchain node BC2, and the blockchain node BC3 that vote for the blockchain node BC1, and the blockchain node BC4 and the blockchain node BC5 that vote against the blockchain node BC1 but send the online transaction.

For the fourth branch chain formed by the block B5, the block B6, and the block B7, the fork processing module of the blockchain node BC1 may find a leader proof of the blockchain node BC3 in the block B5 by traversing the blocks. Therefore, the fork processing module of the blockchain node BC3 may collect statistics on the quantity of participants of the fourth branch chain, and the participants include: the blockchain node BC3, the blockchain node BC4, and the blockchain node BC5 that vote for the blockchain node BC3.

It may be learned through comparison that the blockchain node BC3, the blockchain node BC4, and the blockchain node BC5 are all participants in the two chains. However, the blockchain node BC3, the blockchain node BC4, and the blockchain node BC5 become the participants of the third chain relatively early, and the participants of the fourth branch chain relatively late. Therefore, the blockchain node BC3, the blockchain node BC4, and the blockchain node BC5 are deleted from the participants of the third branch chain.

The participants of the third branch chain include the blockchain node BC1 and the blockchain node BC2.

The participants of the fourth branch chain include the blockchain node BC3, the blockchain node BC4, and the blockchain node BC5.

The fork processing module of the blockchain node BC1 changes the leader state to a follower state, discards the third branch chain, and places transactions in the block B5 and the block B6 back into the transaction pool. Therefore, the blockchain in the blockchain node BC1 includes the block B1, the block B2, the block B3, the block B4, the block B5, the block B6, and the block B7.

Operations performed by the blockchain node BC2 are similar to those performed by the blockchain node BC1, except that the leader state does not need to be changed to the follower state. Details are not described herein again.

After the blockchain node BC4 receives the block B7 sent by the blockchain node BC3, the fork processing module in the blockchain node BC4 determines whether one of the following cases is met: (a) A block height of the block B7 is equal to a value obtained by adding 1 to a block height of the last block in a blockchain of the blockchain node BC4, and a parent node hash value of the block B7 is not equal to a hash value of the last block in the blockchain of the blockchain node BC4. (b) The block height of the block B7 is less than the value obtained by adding 1 to the block height of the last block in the blockchain of the blockchain node BC4, and a hash value of the block B7 is different from a hash value of a block B7 in the blockchain of the blockchain node BC4. (c) The block height of the block B7 is greater than the value obtained by adding 1 to the block height of the last block in the blockchain of the blockchain node BC4. When any one of the foregoing cases is not met, the blockchain node BC4 determines that there is no fork. Herein, the fork processing module in the blockchain node BC4 determines that any case is not met, and the blockchain node BC4 determines that there is no fork. If there is no fork, the blockchain node BC4 performs flushing according to the foregoing block synchronization process.

Operations performed by the blockchain node BC5 are similar to those performed by the blockchain node BC4. Details are not described herein again.

After the foregoing process, the blockchain in the blockchain node BC1 to the blockchain node BC5 includes the block B1, the block B2, the block B3, the block B4, the block B5, the block B6, and the block B7, in other words, there is no fork in the blockchain system.

Figure 17:
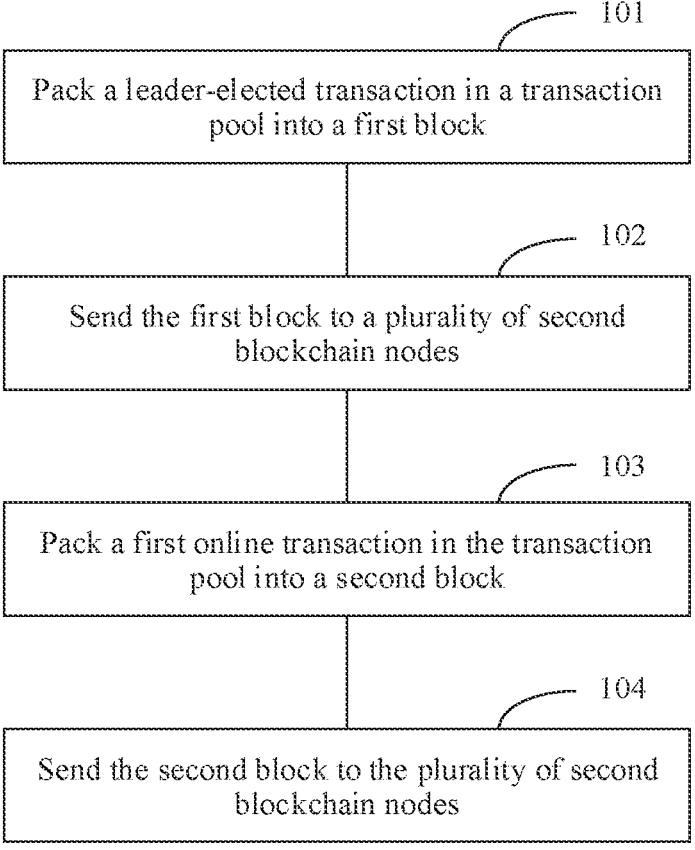
FIG. 17 is a schematic flowchart of a fork processing method according to this application.

FIG. 17 is a schematic flowchart of a fork processing method according to this application. The fork processing method in this embodiment includes the following steps.

101: Pack a leader-elected transaction in a transaction pool into a first block when a first blockchain node is a leader, where the leader-elected transaction records a leader proof of the first blockchain node.

In a specific implementation, the leader proof records a voting state in which each of the plurality of second blockchain nodes votes on the first blockchain node, and the voting state indicates whether a vote is a positive vote or a negative vote. In addition, the leader proof may further include a quantity of positive votes, a total quantity of votes, and the like. This is not specifically limited herein.

In a specific implementation, the leader proof may be generated in the following manner: in a trusted execution environment of the first blockchain node, obtaining a voting state in which each of the plurality of second blockchain nodes votes on the first blockchain node, and signing the voting state by using a signature generation function, to obtain the leader proof.

In a specific implementation, the first blockchain node may obtain a leader state in the following manner: The first blockchain node sends a voting notification to each of the plurality of second blockchain nodes, where the voting notification is used to indicate a blockchain node that receives the voting notification to vote; the first blockchain node receives a vote from each of the plurality of second blockchain nodes, where the vote is the positive vote or the negative vote; and when the quantity of positive votes is greater than a quantity of negative votes, the first blockchain node changes a state of the first blockchain node to the leader, where the leader can generate a block to each of the plurality of second blockchain nodes.

In a specific implementation, the voting notification may be generated in the following manner: in the trusted execution environment of the first blockchain node, triggering a timer to perform timing, where a timing time period of the timer is a random waiting time period; and when the timer times out in waiting for the random waiting time period, signing the random waiting time period by using a signature generation function, to obtain the time proof; and generating the voting notification based on the time proof.

In a specific implementation, the voting notification may be sent in the following manner: When no block sent by another blockchain node is received within the random waiting time period, the first blockchain node sends the voting notification to each of the plurality of second blockchain nodes.

In a specific implementation, the vote is in an encrypted state when being transmitted between a trusted execution environment of the second blockchain node and the trusted execution environment of the first blockchain node. In other words, the second blockchain node generates and encrypts the vote in the trusted execution environment, and then sends an encrypted vote to the first blockchain node. After receiving the encrypted vote, the first blockchain node sends the encrypted vote to the trusted execution environment of the first blockchain node, and then decrypts the encrypted vote.

102: The first blockchain node sends the first block to the plurality of second blockchain nodes.

103: The first blockchain node packs a first online transaction in the transaction pool into a second block.

In a specific implementation, the first online transaction records that a third blockchain node becomes a follower of the first blockchain node, and the third blockchain node is a node that is in the plurality of second blockchain nodes and that does not vote for the first blockchain node.

104: The first blockchain node sends the second block to the plurality of second blockchain nodes.

In a specific implementation, when determining that there is a fork, the first block blockchain node may determine a quantity of participants based on the leader-elected transaction and the first online transaction, to perform fork processing.

In a specific implementation, the first blockchain node determines that there is a fork in a blockchain of the first blockchain node, where the fork includes a first branch chain and a second branch chain, both the first branch chain and the second branch chain start from a fork point, blocks before the fork point are the same, a last block of the first branch chain is sent by the first blockchain node, and a last block of the second branch chain is sent by a fourth blockchain node; compares a quantity of participants of the first branch chain with a quantity of participants of the second branch chain, where the participants of the first branch chain include the third blockchain node and a node that votes for the first blockchain node, and the participants of the second branch chain include a node that votes for the fourth blockchain node, and a node that does not vote for the fourth blockchain node but that is represented as a follower of the fourth blockchain node by using a second online transaction; when the quantity of participants of the first branch chain is greater than the quantity of participants of the second branch chain, retains the first branch chain, and discards the second branch chain; when the quantity of participants of the second branch chain is greater than the quantity of participants of the first branch chain, retains the second branch chain, and discards the first branch chain; and when the quantity of participants of the first branch chain is equal to the quantity of participants of the second branch chain, retains a branch chain corresponding to a node that becomes the leader later and that is the first blockchain node or the fourth blockchain node, and discards another blockchain.

In a specific implementation, the first blockchain node may determine, in the following manner, whether there is the fork: (a) A block height of a block is higher than a value obtained by adding 1 to a block height of the last block in a blockchain of the blockchain node; and a parent node hash value of the block is not equal to a hash value of the last block in the blockchain of the blockchain node. (b) The block height of the block is less than the value obtained by adding 1 to the block height of the last block in the blockchain of the blockchain node, and the hash value of the block is different from the hash value of the last block in the blockchain of the blockchain node. (c) The block height of the block is greater than the value obtained by adding 1 to the block height of the last block in the blockchain of the blockchain node. When any one of the foregoing cases is met, the first blockchain node determines that there is the fork in the blockchain of the first blockchain node.

For ease of description, this embodiment does not provide detailed descriptions for an election process, a block synchronization process, and a fork processing process. For details, refer to FIG. 1 to FIG. 16 and related descriptions.

Figure 18:
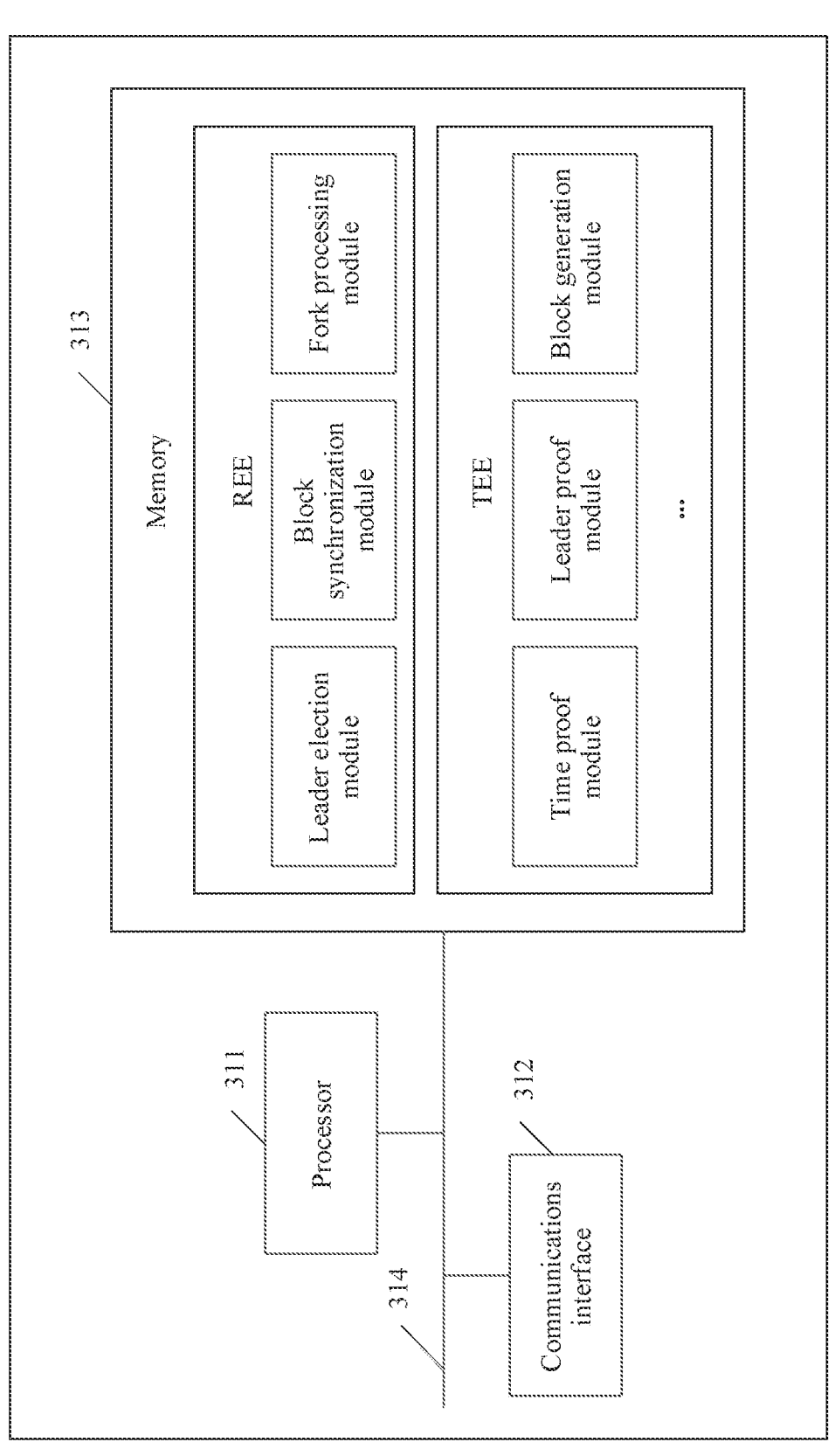
FIG. 18 is a schematic structural diagram of a blockchain node according to this application.

FIG. 18 is a schematic structural diagram of a blockchain node according to this application. As shown in FIG. 18, the blockchain node in this application includes one or more processors 311, a communications interface 312, and a memory 313. The processor 311, the communications interface 312, and the memory 313 may be connected through a bus 314.

The processor 311 includes one or more general purpose processors. The general purpose processor may be any type of device that can process an electronic instruction. The general purpose processor includes a Central Processing Unit (CPU), a microprocessor, a microcontroller, a main processor, a controller, an Application Specific Integrated Circuit (ASIC), or the like. The processor 311 executes various types of digital storage instructions, for example, software or firmware instructions stored in the memory 313, so that a computing device provides various relatively wide range of services. For example, the processor 311 can execute a program or process data, to execute at least a part of the method discussed in this specification.

The communications interface 312 may be a wired interface (for example, an Ethernet interface), and is configured to communicate with another compute node or user.

The memory 313 may include a Volatile Memory, for example, a Random Access Memory (RAM). The memory may further include a Non-Volatile Memory, for example, a Read-Only Memory (ROM), a Flash Memory, a Hard Disk Drive (HDD), or a Solid-State Drive (SSD). Alternatively, the memory may include a combination of the foregoing types of memories. The memory 313 may store program code and program data.

The processor 311 may be configured to invoke the program code in the memory 313, to perform the following steps.

The processor 311 packs a leader-elected transaction in a transaction pool into a first block when a first blockchain node is a leader, where the leader-elected transaction records a leader proof of the first blockchain node.

In a specific implementation, the leader proof records a voting state in which each of the plurality of second blockchain nodes votes on the first blockchain node, and the voting state indicates whether a vote is a positive vote or a negative vote. In addition, the leader proof may further include a quantity of positive votes, a total quantity of votes, and the like. This is not specifically limited herein.

In a specific implementation, the leader proof may be generated in the following manner: In a trusted execution environment of the first blockchain node, the processor 311 obtains a voting state in which each of the plurality of second blockchain nodes votes on the first blockchain node, and the processor 311 signs the voting state by using a signature generation function, to obtain the leader proof.

In a specific implementation, the first blockchain node may obtain a leader state in the following manner: The communications interface 312 sends a voting notification to each of the plurality of second blockchain nodes, where the voting notification is used to indicate a blockchain node that receives the voting notification to vote; the communications interface 312 receives a vote from each of the plurality of second blockchain nodes, where the vote is the positive vote or the negative vote; and when a quantity of positive votes is greater than a quantity of negative votes, the processor 311 changes a state of the first blockchain node to the leader, where the leader is capable of generating a block to each of the plurality of second blockchain nodes.

In a specific implementation, the voting notification may be generated in the following manner: In the trusted execution environment of the first blockchain node, the processor 311 triggers a timer to perform timing, where a timing time period of the timer is a random waiting time period; when the timer times out in waiting for the random waiting time period, the processor 311 signs the random waiting time period by using a signature generation function, to obtain a time proof; and the processor 311 generates the voting notification based on the time proof.

In a specific implementation, the voting notification may be sent in the following manner: When no block sent by another blockchain node is received within the random waiting time period, the communications interface 312 sends the voting notification to each of the plurality of second blockchain nodes.

In a specific implementation, the vote is in an encrypted state when being transmitted between a trusted execution environment of the second blockchain node and the trusted execution environment of the first blockchain node. In other words, the second blockchain node generates and encrypts the vote in the trusted execution environment, and then sends an encrypted vote to the first blockchain node. After receiving the encrypted vote, the first blockchain node sends the encrypted vote to the trusted execution environment of the first blockchain node, and then decrypts the encrypted vote.

The communications interface 312 sends the first block to the plurality of second blockchain nodes.

The processor 311 packs a first online transaction in the transaction pool into a second block.

In a specific implementation, the first online transaction records that a third blockchain node becomes a follower of the first blockchain node, and the third blockchain node is a node that is in the plurality of second blockchain nodes and that does not vote for the first blockchain node.

The communications interface 312 sends the second block to the plurality of second blockchain nodes.

In a specific implementation, when determining that there is a fork, the processor 311 may determine a quantity of participants based on the leader-elected transaction and the first online transaction, to perform fork processing.

In a specific implementation, the processor 311 determines that there is a fork in a blockchain of the first blockchain node, where the fork includes a first branch chain and a second branch chain, both the first branch chain and the second branch chain start from a fork point, blocks before the fork point are the same, a last block of the first branch chain is sent by the first blockchain node, and a last block of the second branch chain is sent by a fourth blockchain node. The processor 311 compares a quantity of participants of the first branch chain with a quantity of participants of the second branch chain, where the participants of the first branch chain include the third blockchain node and a node that votes for the first blockchain node, and the participants of the second branch chain include a node that votes for the fourth blockchain node, and a node that does not vote for the fourth blockchain node but that is represented as a follower of the fourth blockchain node by using a second online transaction. When the quantity of participants of the first branch chain is greater than the quantity of participants of the second branch chain, the processor 311 retains the first branch chain, and discards the second branch chain. When the quantity of participants of the second branch chain is greater than the quantity of participants of the first branch chain, the processor 311 retains the second branch chain, and discards the first branch chain. When the quantity of participants of the first branch chain is equal to the quantity of participants of the second branch chain, the processor 311 retains a branch chain corresponding to a node that becomes the leader later and that is the first blockchain node or the fourth blockchain node, and discards another blockchain.

In a specific implementation, the processor 311 may determine, in the following manner, whether there is the fork: (a) A block height of a block is higher than a value obtained by adding 1 to a block height of the last block in a blockchain of the blockchain node; and a parent node hash value of the block is not equal to a hash value of the last block in the blockchain of the blockchain node. (b) The block height of the block is less than the value obtained by adding 1 to the block height of the last block in the blockchain of the blockchain node, and the hash value of the block is different from the hash value of the block in the blockchain of the blockchain node. (c) The block height of the block is greater than the value obtained by adding 1 to the block height of the last block in the blockchain of the blockchain node. When any one of the foregoing cases is met, the first blockchain node determines that there is the fork in the blockchain of the first blockchain node.

For ease of description, this embodiment does not provide detailed descriptions for an election process, a block synchronization process, and a fork processing process. For details, refer to FIG. 1 to FIG. 16 and related descriptions.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A fork processing method, comprising:
packing, by a first blockchain node, a leader-elected transaction in a transaction pool into a first block, wherein the first blockchain node is a leader node, the leader-elected transaction records a leader proof of the first blockchain node, the leader proof records a voting state based on votes sent by each of a plurality of second blockchain nodes to the first blockchain node, and the voting state indicates whether a vote is a positive vote or a negative vote, wherein the leader proof is generated in a trusted execution environment (TEE) of the first blockchain node, and wherein the votes are encrypted in TEEs of the plurality of second blockchain nodes and sent as encrypted votes to the first blockchain node, and the encrypted votes are decrypted in the TEE of the first blockchain node;
sending, by the first blockchain node, the first block to the plurality of second blockchain nodes;
packing, by the first blockchain node, a first online transaction in the transaction pool into a second block, wherein the first online transaction records that a third blockchain node becomes a follower of the first blockchain node, and the third blockchain node is in the plurality of second blockchain nodes and does not vote for the first blockchain node;
sending, by the first blockchain node, the second block to the plurality of second blockchain nodes;
determining a quantity of participants based on the leader-elected transaction and the first online transaction; and
performing, based on the leader proof, a fork processing by the participants of the quantity of participants.

2. The method according to claim 1, comprising:
determining that a fork exists in a blockchain of the first blockchain node, wherein the fork comprises a first branch chain and a second branch chain, the first branch chain and the second branch chain start from a fork point, blocks before the fork point are the same, a last block of the first branch chain is sent by the first blockchain node, and a last block of the second branch chain is sent by a fourth blockchain node; and
comparing a quantity of participants of the first branch chain with a quantity of participants of the second branch chain, wherein the participants of the first branch chain comprise the third blockchain node and a node that votes for the first blockchain node, and the participants of the second branch chain comprise a node that votes for the fourth blockchain node, and a node that does not vote for the fourth blockchain node but that is represented as a follower of the fourth blockchain node by using a second online transaction, and wherein comparing the quantity of participants of the first branch chain with a quantity of participants of the second branch chain further comprises:
in response to determining that the quantity of participants of the first branch chain is greater than the quantity of participants of the second branch chain, retaining the first branch chain, and discarding the second branch chain;
in response to determining that the quantity of participants of the second branch chain is greater than the quantity of participants of the first branch chain, retaining the second branch chain, and discarding the first branch chain; and in response to determining that the quantity of participants of the first branch chain is equal to the quantity of participants of the second branch chain, retaining a branch chain corresponding to a node that becomes a leader later and that is the first blockchain node or the fourth blockchain node, and discarding another blockchain.

3. The method according to claim 1, wherein before packing the leader-elected transaction in the transaction pool into the first block, the method further comprises:
sending, by the first blockchain node, a voting notification to each of the plurality of second blockchain nodes, wherein the voting notification indicates a blockchain node that receives the voting notification to vote;
receiving a vote from each of the plurality of second blockchain nodes, wherein the vote is the positive vote or the negative vote; and
in response to determining that a quantity of positive votes is greater than a quantity of negative votes, changing a state of the first blockchain node to a leader, wherein the leader is capable of generating a block to each of the plurality of second blockchain nodes.

4. The method according to claim 3, wherein before sending the voting notification to each of the plurality of second blockchain nodes, the first blockchain node performs, in the TEE of the first blockchain node, operations comprising:
triggering a timer to perform timing, wherein a timing time period of the timer is a random waiting time period;
in response to determining that the timer times out in waiting for the random waiting time period, signing the random waiting time period by using a signature generation function, to obtain a time proof; and
generating the voting notification based on the time proof.

5. The method according to claim 4, wherein sending the voting notification to each of the plurality of second blockchain nodes comprises:
in response to determining that no block sent by another blockchain node is received within the random waiting time period, sending, by the first blockchain node, the voting notification to each of the plurality of second blockchain nodes.

6. An apparatus for fork processing, wherein the apparatus is a first blockchain node, comprising at least one processor; and one or more memories coupled to the at least one processor and storing programming instructions for execution by the at least one processor to cause the apparatus to:
pack a leader-elected transaction in a transaction pool into a first block, wherein the first blockchain node is a leader node, the leader-elected transaction records a leader proof of the first blockchain node, the leader proof records a voting state based on votes sent by each of a plurality of second blockchain nodes to the first blockchain node, and the voting state indicates whether a vote is a positive vote or a negative vote, wherein the leader proof is generated in a trusted execution environment (TEE) of the first blockchain node, and wherein the votes are encrypted in TEEs of the plurality of second blockchain nodes and sent as encrypted votes to the first blockchain node, and the encrypted votes are decrypted in the TEE of the first blockchain node;
send the first block to the plurality of second blockchain nodes;
pack a first online transaction in the transaction pool into a second block, wherein the first online transaction records that a third blockchain node becomes a follower of the first blockchain node, and the third block-chain node is in the plurality of second blockchain nodes and does not vote for the first blockchain node;

send the second block to the plurality of second block-chain nodes;

determine a quantity of participants based on the leader-elected transaction and the first online transaction; and perform, based on the leader proof, a fork processing by the participants of the quantity participants.

7. The apparatus according to claim 6, further causes the apparatus to:

determine that a fork exists in a blockchain of the first blockchain node, wherein the fork comprises a first branch chain and a second branch chain, the first branch chain and the second branch chain start from a fork point, blocks before the fork point are the same, a last block of the first branch chain is sent by the first blockchain node, and a last block of the second branch chain is sent by a fourth blockchain node; and compare a quantity of participants of the first branch chain with a quantity of participants of the second branch chain, wherein the participants of the first branch chain comprise the third blockchain node and a node that votes for the first blockchain node, and the participants of the second branch chain comprise a node that votes for the fourth blockchain node, and a node that does not vote for the fourth blockchain node but that is repre-sented as a follower of the fourth blockchain node by using a second online transaction, and wherein com-pare the quantity of participants of the first branch chain with the quantity of participants of the second branch chain further comprising:

in response to determining that the quantity of partici-pants of the first branch chain is greater than the quantity of participants of the second branch chain, retain the first branch chain, and discarding the second branch chain;

in response to determining that the quantity of partici-pants of the second branch chain is greater than the quantity of participants of the first branch chain, retain the second branch chain, and discarding the first branch chain; and in response to determining that the quantity of partici-pants of the first branch chain is equal to the quantity of participants of the second branch chain, retain a branch chain corresponding to a node that becomes the leader later and that is the first blockchain node or the fourth blockchain node, and discarding another blockchain.

8. The apparatus according to claim 6, wherein before packing the leader-elected transaction in the transaction pool into the first block, further causes the apparatus to:

send a voting notification to each of the plurality of second blockchain nodes, wherein the voting notifica-tion indicates a blockchain node that receives the voting notification to vote;

receive a vote from each of the plurality of second blockchain nodes, wherein the vote is the positive vote or the negative vote; and in response to determining that a quantity of positive votes is greater than a quantity of negative votes, change a state of the first blockchain node to the leader, wherein the leader is capable of generating a block to each of the plurality of second blockchain nodes.

9. The apparatus according to claim 6, wherein before sending a voting notification to each of the plurality of second blockchain nodes, further causes the apparatus per-forms, in the TEE of the first blockchain node, operations comprising:

triggering a timer to perform timing, wherein a timing time period of the timer is a random waiting time period;

in response to determining that the timer times out in waiting for the random waiting time period, signing the random waiting time period by using a signature gen-eration function, to obtain a time proof; and generating the voting notification based on the time proof.

10. The apparatus according to claim 9, wherein sending the voting notification to each of the plurality of second blockchain nodes further causes the apparatus to:

in response to determining that no block sent by another blockchain node is received within the random waiting time period, sending the voting notification to each of the plurality of second blockchain nodes.

11. A non-transitory computer-readable storage medium storing one or more instructions for scheduling a task processing that, when executed by at least one processor, cause the at least one processor to:

pack a leader-elected transaction in a transaction pool into a first block, wherein a first blockchain node is a leader node, the leader-elected transaction records a leader proof of the first blockchain node, the leader proof records a voting state based on votes sent by each of a plurality of second blockchain nodes to the first block-chain node, and the voting state indicates whether a vote is a positive vote or a negative vote, wherein the leader proof is generated in a trusted execution envi-ronment (TEE) of the first blockchain node, and wherein the votes are encrypted in TEEs of the plurality of second blockchain nodes and sent as encrypted votes to the first blockchain node, and the encrypted votes are decrypted in the TEE of the first blockchain node;

send the first block to the plurality of second blockchain nodes;

pack a first online transaction in the transaction pool into a second block, wherein the first online transaction records that a third blockchain node becomes a fol-lower of the first blockchain node, and the third block-chain node is in the plurality of second blockchain nodes and does not vote for the first blockchain node;

send the second block to the plurality of second block-chain nodes;

determine a quantity of participants based on the leader-elected transaction and the first online transaction; and perform, based on the leader proof, a fork processing by the participants of the quantity of participants.

12. The non-transitory computer-readable storage medium according to claim 11, wherein the one or more instructions, when executed by the at least one processor, cause the at least one processor to:

determine that a fork exists in a blockchain of the first blockchain node, wherein the fork comprises a first branch chain and a second branch chain, the first branch chain and the second branch chain start from a fork point, blocks before the fork point are the same, a last block of the first branch chain is sent by the first blockchain node, and a last block of the second branch chain is sent by a fourth blockchain node; and compare a quantity of participants of the first branch chain with a quantity of participants of the second branch chain, wherein the participants of the first branch chain comprise the third blockchain node and a node that votes for the first blockchain node, and the participants of the second branch chain comprise a node that votes for the fourth blockchain node, and a node that does not vote for the fourth blockchain node but that is represented as a follower of the fourth blockchain node by using a second online transaction, and wherein compare the quantity of participants of the first branch chain with the quantity of participants of the second branch chain further comprising:

in response to determining that the quantity of participants of the first branch chain is greater than the quantity of participants of the second branch chain, retaining the first branch chain, and discarding the second branch chain;

in response to determining that the quantity of participants of the second branch chain is greater than the quantity of participants of the first branch chain, retaining the second branch chain, and discarding the first branch chain; and in response to determining that the quantity of participants of the first branch chain is equal to the quantity of participants of the second branch chain, retaining a branch chain corresponding to a node that becomes the leader later and that is the first blockchain node or the fourth blockchain node, and discarding another blockchain.

13. The non-transitory computer-readable storage medium according to claim 11, wherein before packing the leader-elected transaction in the transaction pool into the first block, the one or more instructions, when executed by the at least one processor, cause the at least one processor to:

send a voting notification to each of the plurality of second blockchain nodes, wherein the voting notification indicates a blockchain node that receives the voting notification to vote;

receive a vote from each of the plurality of second blockchain nodes, wherein the vote is the positive vote or the negative vote; and in response to determining that a quantity of positive votes is greater than a quantity of negative votes, change a state of the first blockchain node to the leader, wherein the leader is capable of generating a block to each of the plurality of second blockchain nodes.

14. The non-transitory computer-readable storage medium according to claim 13, wherein before sending the voting notification to each of the plurality of second blockchain nodes, the one or more instructions, when executed by the at least one processor, cause the at least one processor to perform, in the TEE of the first blockchain node, operations comprising:

triggering a timer to perform timing, wherein a timing time period of the timer is a random waiting time period;

in response to determining that the timer times out in waiting for the random waiting time period, signing the random waiting time period by using a signature generation function, to obtain a time proof; and generating the voting notification based on the time proof.

15. The non-transitory computer-readable storage medium according to claim 14, wherein one or more instructions, when executed the at least one processor, cause the at least one processor to:

in response to determining that no block sent by another blockchain node is received within the random waiting time period, sending, by the first blockchain node, the voting notification to each of the plurality of second blockchain nodes.

\* \* \* \* \*